United States Patent [19]

Sako et al.

[11] Patent Number: 5,689,575
[45] Date of Patent: Nov. 18, 1997

[54] METHOD AND APPARATUS FOR PROCESSING IMAGES OF FACIAL EXPRESSIONS

[75] Inventors: Hiroshi Sako, County Dublin; Anthony Smith, Dublin, both of Ireland; Mark Whitehouse, West Sussex, England

[73] Assignee: Hitachi, Ltd., Tokyo, Japan

[21] Appl. No.: 346,164

[22] Filed: Nov. 21, 1994

[30] Foreign Application Priority Data

Nov. 22, 1993 [IE] Ireland ................... 93 0889

[51] Int. Cl.⁶ .................. G06K 9/00; G06K 9/46; G06K 9/54
[52] U.S. Cl. .................. 382/118; 382/170; 382/190; 382/303
[58] Field of Search .................. 382/115, 118, 382/164, 165, 170, 171, 173, 190, 191, 303

[56] References Cited

U.S. PATENT DOCUMENTS

| 4,484,349 | 11/1984 | McCubbrey | 382/303 |
| 4,975,978 | 12/1990 | Ando | 382/118 |
| 4,991,223 | 2/1991 | Bradley | 382/165 |
| 5,253,302 | 10/1993 | Massen | 382/164 |
| 5,291,563 | 3/1994 | Maeda | 382/190 |
| 5,343,538 | 8/1994 | Kasdan | 382/165 |
| 5,459,793 | 10/1995 | Naoi | 382/165 |
| 5,467,410 | 11/1995 | Bloomberg | 382/181 |
| 5,473,705 | 12/1995 | Abe | 382/100 |
| 5,495,428 | 2/1996 | Schwartz | 382/171 |

FOREIGN PATENT DOCUMENTS 0 474 307   3/1992   European Pat. Off. .

Primary Examiner—Dwayne Bost
Assistant Examiner—Brian L. Johnson
Attorney, Agent, or Firm—Kenyon & Kenyon

[57] ABSTRACT

A real time output containing data relating to states of facial parts is generated. A facial area detection unit (11) has monitoring (51–57) and determining (59–61) processing circuits operating in a pipelining manner to determine position of the facial area. The monitoring circuits (51–57) monitor pixel value frequency using 3D histogram and backprojection processing. The generating facial area signal has masks applied by a unit (12) which supplies data to mouth area and eye area detection units (14,15). Each of these operate on similar principles to the facial area detection unit (11).

19 Claims, 45 Drawing Sheets

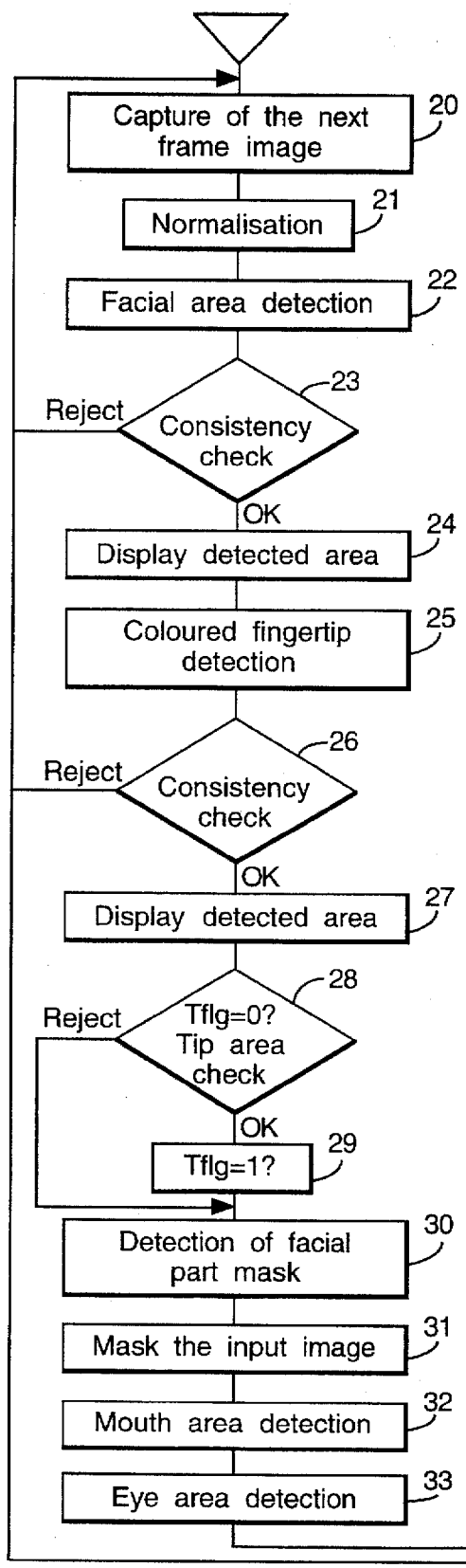
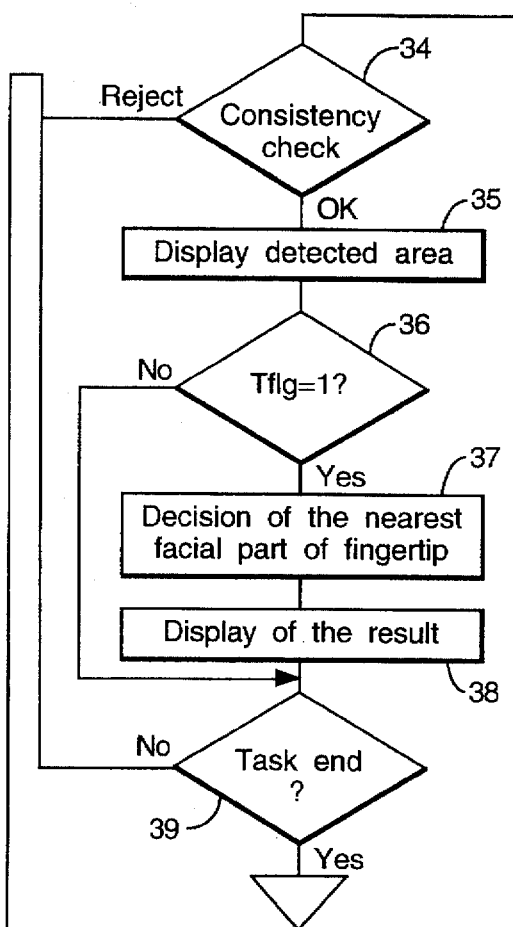
Fig. 2(a).

Fig.2(b).

| Processing name | Input | Output | |
|---|---|---|---|
| Capture of the next frame image | | Input RGB image | 20 |
| Normalisation | Input RGB image | RGB image | 21 |
| Facial area detection | RGB image | Position:(Xf,Yf,Wf,Hf) Area:Af | 22 |
| Consistency check | Position:(Xf,Yf,Wf,Hf) Area:Af | OK / Reject | 23 |
| Display detected area | Position:(Xf,Yf,Wf,Hf) | Square box on monitor | 24 |
| Coloured fingertip detection | RGB image | Position:(Xt,Yt,Wt,Ht) Area:At | 25 |
| Consistency check | Position:(Xt,Yt,Wt,Ht) Area:At | OK / Reject | 26 |
| Display detected area | Position:(Xt,Yt,Wt,Ht) | Square box | 27 |
| Tip area check | At   At+,At-: constant | If At+<At<At- then Tflg=1 else Tflg=0 | 28 |
| Detection of facial part mask | BFimage | MouthMask EyesMask | 30 |
| Mask the input image | RGB image MouthMask EyesMask | MRGB image ERGB image | 31 |
| Mouth area detection | MRGB image Histogram template | Position:(Xm,Ym,Wm,Hm) Area:Am | 32 |
| Eye area detection | ERGB image | Position:(Xe1,Ye1) Position:(Xe2,Ye2) | 33 |
| Consistency check | Position:(Xm,Ym,Wm,Hm) Area:Am Position:(Xe1,Ye1) Position:(Xe2,Ye2) | OK Reject | 34 |
| Display detected area | Position:(Xm,Ym,Wm,Hm) Position:(Xe,Ye,We,He) | Square box Square box | 35 |
| Decision of the nearest facial part of fingertip | Position:(Xm,Ym,Wm,Hm) Position:(Xt,Yt,Wt,Ht) Position:(Xe1,Ye1) Position:(Xe2,Ye2) | Decision result | 37 |
| Display of the result | Decision result | Square box with the different colour | 38 |

Fig.3(a).

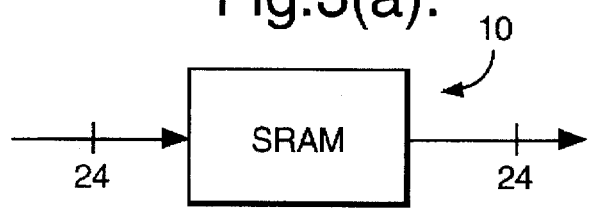

Fig.3(b).

| 1. Input: Input RGB image |
|---|
| 2. Output: (Normalised) RGB image |
| 3. Function: Translation of RGB value of each pixel according to the following formula<br><br>New $R(i,j)=255*R(i,j)2/(R(i,j)2+G(i,j)2+B(i,j)2)$<br>New $G(i,j)=255*G(i,j)2/(R(i,j)2+G(i,j)2+B(i,j)2)$<br>New $B(i,j)=255*B(i,j)2/(R(i,j)2+G(i,j)2+B(i,j)2)$ |

Fig.3(c).

| 1. Input: Input RGB image |
|---|
| 2. Output: (Normalised) RGB image |
| 3. Function: Translation of RGB value of each pixel according to the following formula<br><br>New $R(i,j)=255*R(i,j)/(R(i,j)+G(i,j)+B(i,j))$<br>New $G(i,j)=255*G(i,j)/(R(i,j)+G(i,j)+B(i,j))$<br>New $B(i,j)=255*B(i,j)/(R(i,j)+G(i,j)+B(i,j))$ |

Fig. 4.

| | Step | Input | Output | Parameter(unfixed) |
|---|---|---|---|---|
| (a) | 3D Histogram | RGB image | 3D Histogram | Bucket size |
| (b) | Backprojection | RGB image<br>3D histogram<br>3D histogram(temp1)<br>3D histogram(temp2)<br>3D histogram(temp3)<br>3D histogram(tempn) | BPimage | Bucket size<br>Number of templates<br>Scale |
| (c) | Reduction of image size | BPimage | RB Pimage | (Reduction rate=1/2) Mx=My=2 |
| (d) | Smoothing 1 | RBPimage | SRB Pimage | Gauss filter size:9 (sigma=1) |
| (e) | Histogram | SRBPimage | Histogram | (Xs,Ys) (Xe,Ye):(0,0) (127,127) |
| (f) | Threshold value search | Histogram | TH | fTH Pm:255,Search Direction:Backword |
| (g) | Threshold of image | SRBPimage | BiBPimage | Const1:1,Const2:0,TH1:TH,TH2:255<br>(Xs,Ys) (Xe,Ye):(0,0) (127,127) |
| (h) | Binary erosion<br>(Repeat) | BiBPimage<br>No. of erosion | ErBiBPimage | Const1:0,Const2:1,Mx:3,My:3<br>No. of erosion=SQR(fTH)/12.0 |
| (i) | Binary dilation*<br>(Repeat) | ErBiBPimage<br>BiBPimage<br>No. of dilation | DiErBiBPimage | Const1:0,Const2:1,Mx:3,My:3<br>No. of dilation=No. of erosion*1.6 |
| (j) | Binary dilation<br>(Repeat) | DiErBiBPimage<br>No. of dilation | D2ErBiBPimage | Const1:0,Const2:1,Mx:3,My:3<br>No. of dilation=SQR(fTH)/12.0 |
| (k) | Binary erosion<br>(Repeat) | D2ErBiBPimage<br>No. of erosion | D2E2BiBPimage | Const1:0,Const2:1,Mx:3,My:3<br>No. of erosion=SQR(fTH)/12.0 |
| (l) | Projection X & Y | D2E2BiBPimage | Projection X<br>Projection Y | (Xs,Ys) (Xe,Ye):(0,0) (127,127) |
| (m) | Projection Search | Projection X<br>Projection Y | Location coordinate<br>(Xsf,Ysf) (Xef,Yef) | Xmin:0,Xmax:127<br>Ymin:0,Ymax:127 N=0.1 |
| (n) | Area counting | D2E2BiBPimage | Af: Area of face | (Xs,Ys) (Xe,Ye):(Xsf,Ysf) (Xef,Yef)<br>Const1:1 |

22

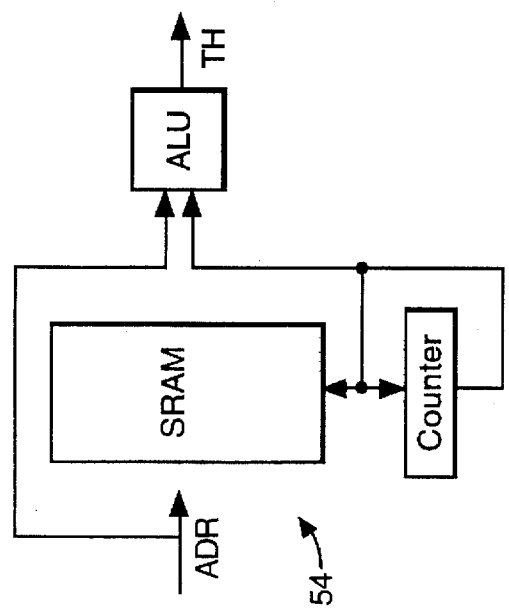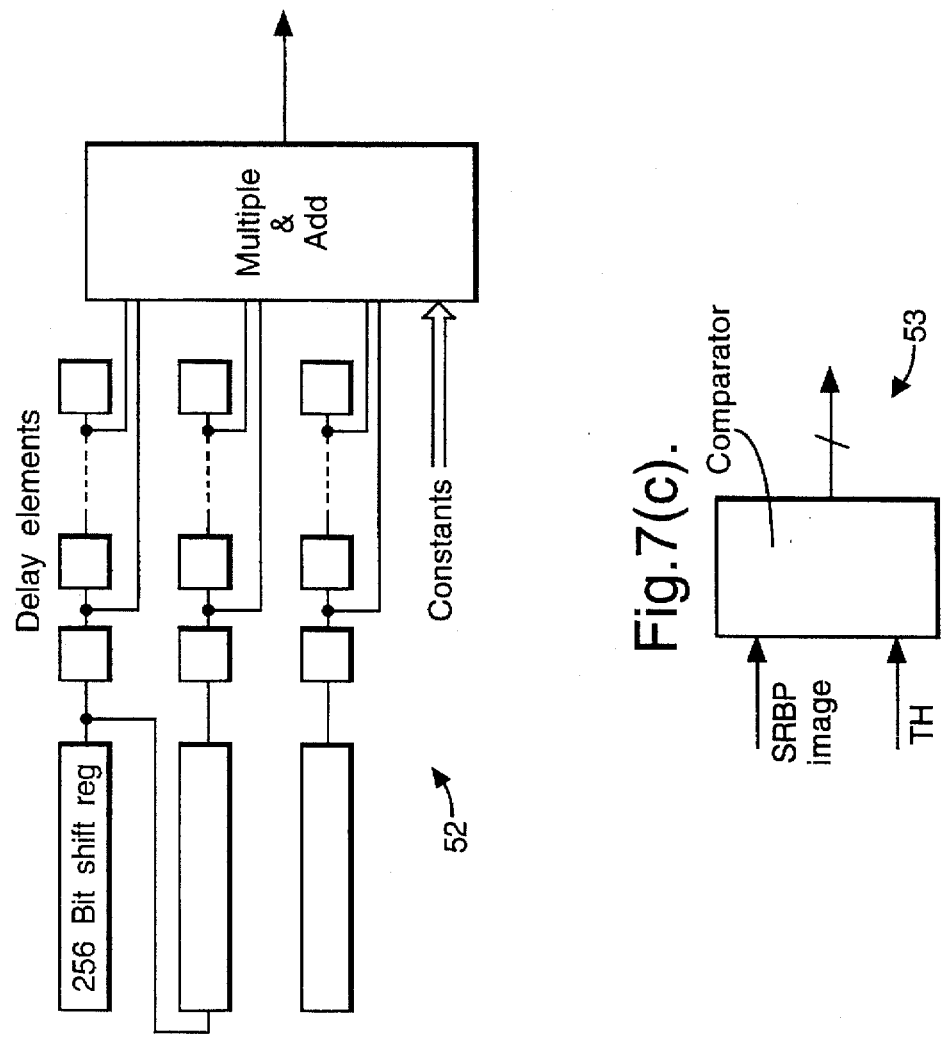

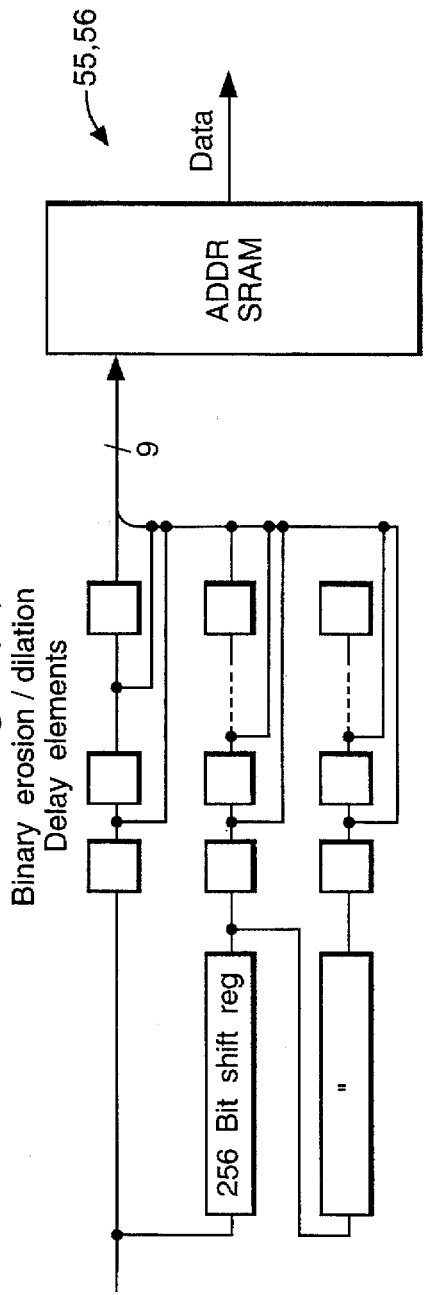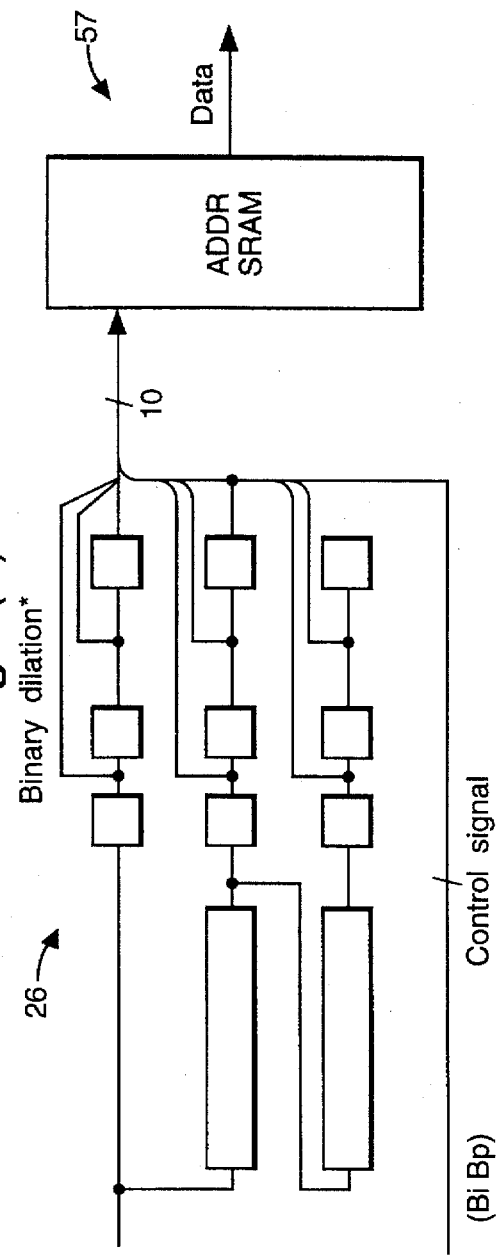

Fig. 12.
INPUT image
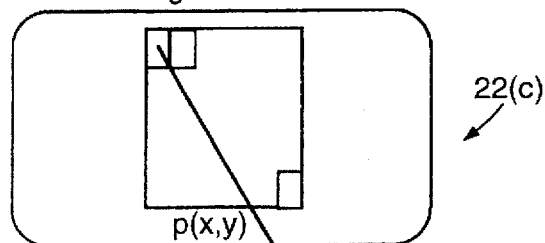
22(c)
FUNCTION
Sum and average operation
$P([x/M_x],[y/M_y]) = \Sigma_i \Sigma_j \, p(x+i, y+j) / M_x / M_y$
$x = 0, M_x, 2M_x, \ldots$
$y = 0, M_y, 2M_y, \ldots$
$M_x, M_y$: Reduction rate for x and y direction
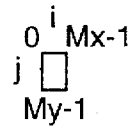
OUTPUT image
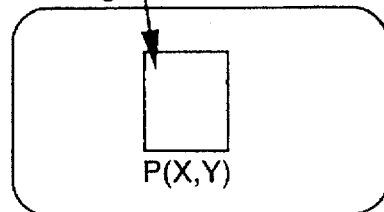
P(X,Y)
PARAMETERS
Reduction rate: $M_x$ and $M_y$ Fig. 17.
INPUT image
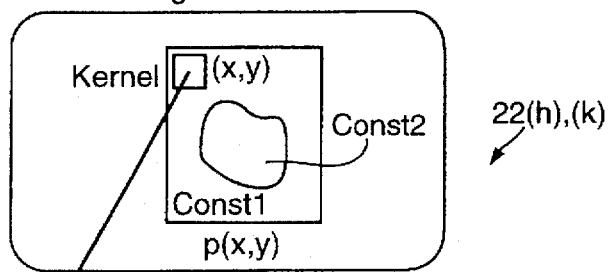
22(h),(k)
FUNCTION
If p(x,y)=Const1 then P(x,y)=Const1
If {p(x,y)=Const2} AND {All pixels in Kernel at (x,y=Const2}
then P(x,y)=Const2 else P(x,y)=Const1
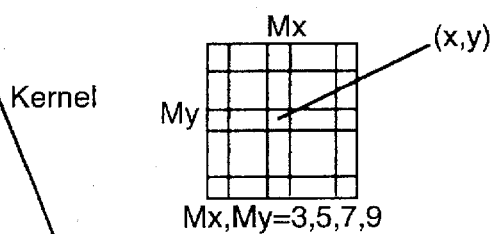
Mx,My=3,5,7,9
OUTPUT image
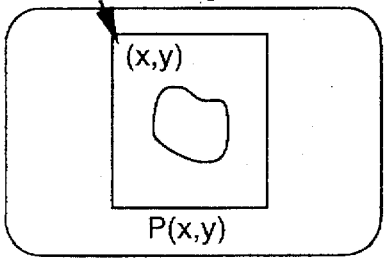
PARAMETERS
Const1,Const2,Mx,My Fig. 18(b). INPUT image
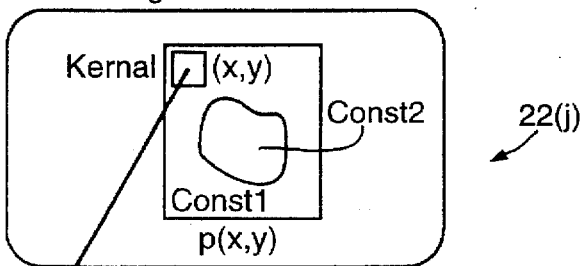
22(j)
FUNCTION
If p(x,y)=Const2 then P(x,y)=Const2
If {p(x,y)=Const1} AND {All pixels in Kernel at (x,y)=Const1}
then P(x,y)=Const1 else P(x,y)=Const2
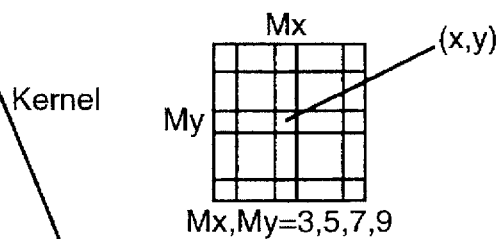
Mx,My=3,5,7,9
OUTPUT image
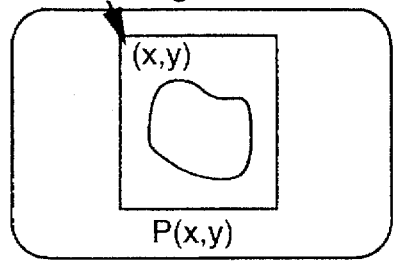
PARAMETERS
Const1,Const2,Mx,My Fig. 19.
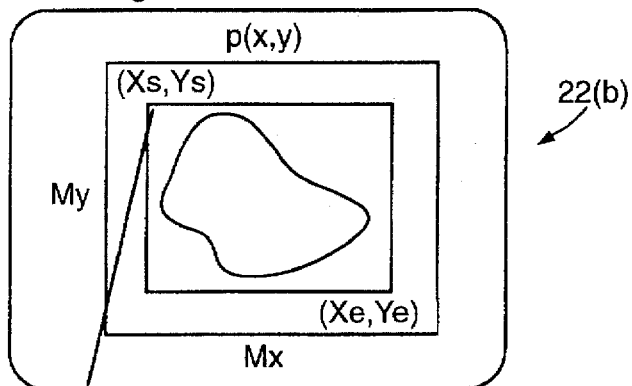
FUNCTION
Proj1(x)=Σp(x,y) (From x=Xs to x=Xe, from y=Ys to y=Ye)
Proj2(y)=Σp(x,y) (From x=Xs to x=Xe, from y=Ys to y=Ye)
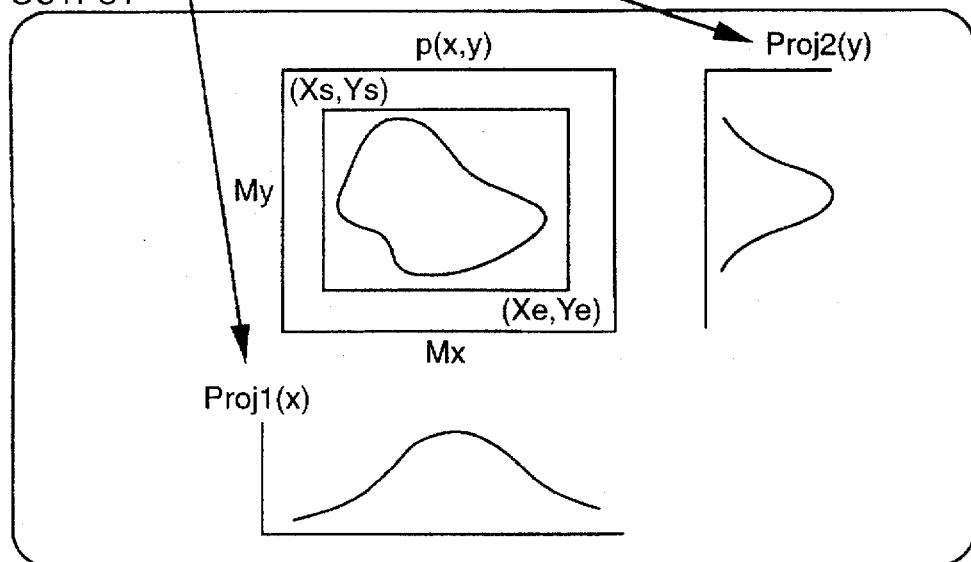
PARAMETERS
(Xs,Ys)  (Xe,Ye)

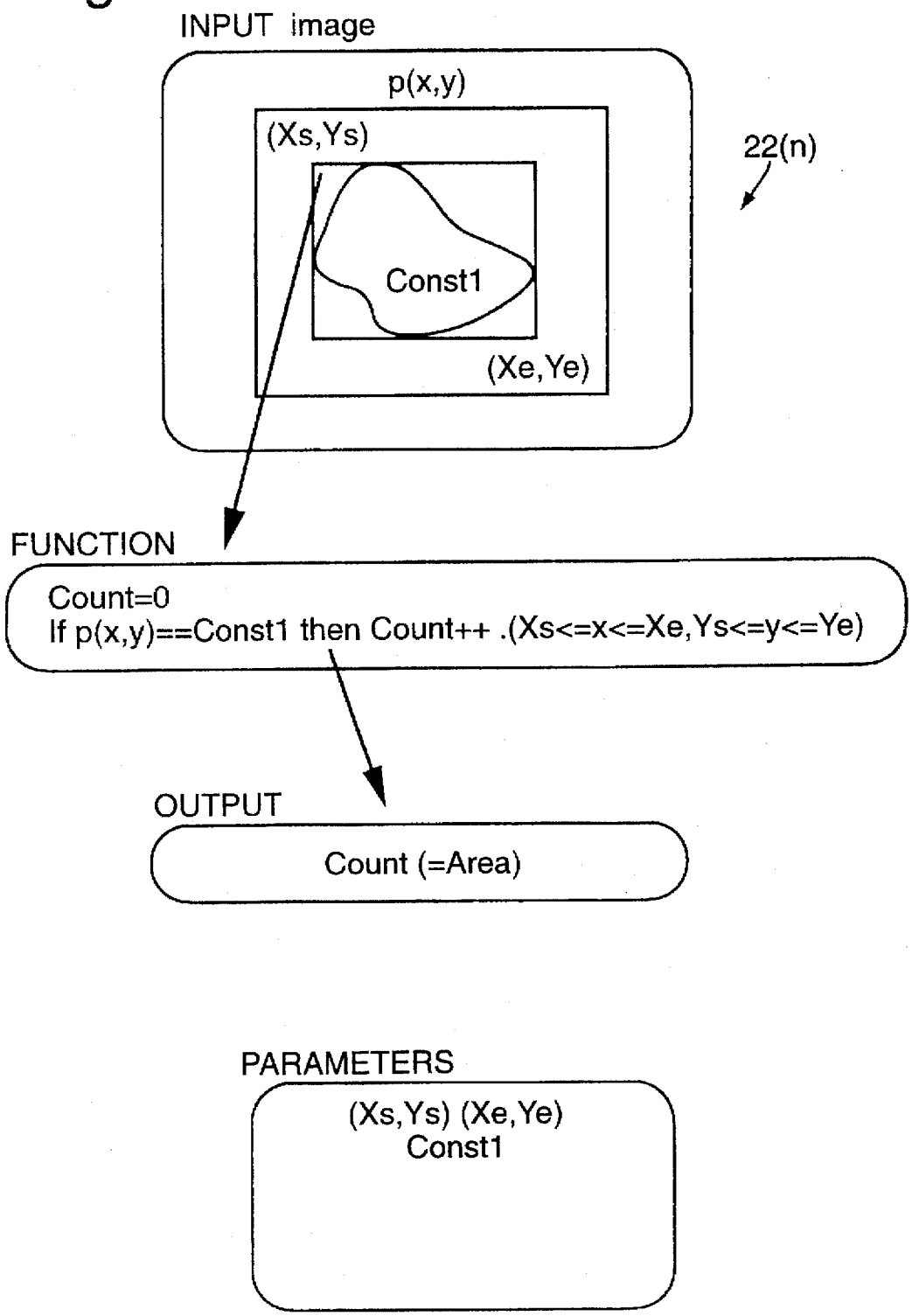

Fig. 22.

| | Step | Input | Output | Parameter (unfixed) |
|---|---|---|---|---|
| (a) | 3D Histogram | RGB image | 3D Histogram | Bucket size |
| (b) | Backprojection | RGB image<br>3D histogram<br>3D histogram(temp1)<br>3D histogram(temp2)<br>3D histogram(temp3)<br>3D histogram(tempn) | BPimage | Bucket size<br>Number of templates<br>Scale |
| (c) | Smoothing2 | BPimage | Smoothed BPimage | Filter size: 5 (=average size) |
| (d) | Max value search | Smoothed BPimage | Max-value XY coordinate | (Xs,Ys) (Xe,Ye):<br>(0,0) (255,255) |
| (e) | Smoothing1 | Smoothed BPimage | SBPimage | Gauss filter size: 5 (sigma=1) |
| (f) | Histogram | SBPimage | BPhistogram | (Xs,Ys) (Xe,Ye)<--XY coordinate, width & height |
| (g) | Threshold value search | BPhistogram | TH | fTH Pm:255,Search Direction:Backword |
| (h) | Threshold of image | SBPimage | BiBPimage | Const1:1,Const2:0,TH1:TH,TH2:255<br>(Xs,Ys) (Xe,Ye)<--XY coordinate,<br>width & height |
| (i) | Binary erosion<br>(Repeat) | BiBPimage | ErBiBPimage | Const1:0,Const2:1,Mx:3,My:3<br>No. of erosion=SQR(fTH)/12.0 |
| (j) | Binary Dilation*<br>(Repeat) | ErBiBPimage<br>BiBPimage | DiErBiBPimage | Const1:0,Const2:1,Mx:3,My:3<br>No. of dilation=No. of erosion*1.6 |
| (k) | Projection X & Y | DiErBiBPimage | Projection X<br>Projection Y | (Xs,Ys) (Xe,Ye)<--XY coordinate,<br>width & height |
| (l) | Projection Search | Projection X<br>Projection Y | Location coordinate<br>(Xst,Yst)  (Xet,Yet) | Xmin,Xmax,Ymin,Ymax<--<br>XY coordinate, width & height N=0.1 |
| (m) | Area counting | DiErBiBPimage | Af: Area of face | (Xs,Ys) (Xe,Ye):(Xst,Yst) (Xet,Yet)<br>Const1:1 |

Fig. 24.
INPUT image
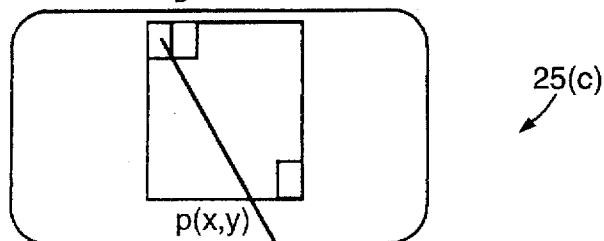
p(x,y)
25(c)
FUNCTION
Multipled by weights and summation
$P(x+Mx/2, y+My/2) = \Sigma i \Sigma j\, M(i,j)^* p(x+i, y+j) / \Sigma i \Sigma j\, M(i,j)$
```
  0   i   Mx-1
j ☐
My-1
```
Smoothing2: Mx=My=3
```
1 1 1
1 1 1
1 1 1
```
Smoothing2: Mx=My=5
```
1 1 1 1 1
1 1 1 1 1
1 1 1 1 1
1 1 1 1 1
1 1 1 1 1
```
Smoothing2: Mx=My=9
```
1 1 1 1 1 1 1 1 1
1 1 1 1 1 1 1 1 1
1 1 1 1 1 1 1 1 1
1 1 1 1 1 1 1 1 1
1 1 1 1 1 1 1 1 1
1 1 1 1 1 1 1 1 1
1 1 1 1 1 1 1 1 1
1 1 1 1 1 1 1 1 1
```
OUTPUT image
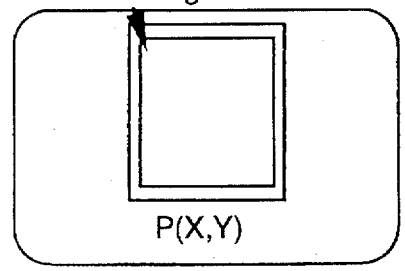
P(X,Y)
PARAMETERS
Filter size: 3,5,9

Fig.30.

| | Step | Input | Output | Parameter (unfixed) |
|---|---|---|---|---|
| (a) | 3D Histogram | RGB image | 3D Histogram | Bucket size |
| (b) | Backprojection | RGB image<br>3D histogram<br>3D histogram(temp1)<br>3D histogram(temp2)<br>3D histogram(temp3)<br>3D histogram(tempn) | BPimage | Bucket size<br>Number of templates<br>Scale |
| (c) | Smoothing2 | BPimage | Smoothed BPimage | Filter size: 9 (=average size) |
| (d) | Max value search | Smoothed BPimage | Max-value XY coordinate | (Xs,Ys) (Xe,Ye):<br>(0,0) (255,255) |
| (e) | Smoothing1 | Smoothed BPimage | SBPimage | Gauss filter size (sigma=1) |
| (f) | Histogram | SBPimage | BPhistogram | (Xs,Ys) (Xe,Ye)<--XY<br>coordinate, width & height |
| (g) | Threshold value search | BPhistogram | TH | fTH Pm:255,Search Direction:Backword |
| (h) | Threshold of image | SBPimage | (Partial) BiBPimage | Const1:1,Const2:0,TH1:TH,TH2:255<br>(Xs,Ys) (Xe,Ye)<--XY coordinate,<br>width & height |
| (i) | Binary erosion (Repeat) | BiBPimage | ErBiBPimage | Const1:0,Const2:1,Mx:3,My:3<br>No. of erosion=SQR(fTH)/12.0 |
| (j) | Binary Dilation* (Repeat) | ErBiBPimage<br>BiBPimage | DiErBiBPimage | Const1:0,Const2:1,Mx:3,My:3<br>No. of dilatiom=No. of erosion*1.6 |
| (k) | Projection X & Y | DiErBiBPimage | Projection X<br>Projection Y | (Xs,Ys) (Xe,Ye)<--XY coordinate,<br>width & height |
| (l) | Projection Search | Projection X<br>Projection Y | Location coordinate<br>(Xsm,Xsm)<br>(Xem,Yem) | Xmin,Xmax,Ymin,Ymax<--<br>XY coordinate, width & height N=0.1 |
| (m) | Area counting | DiErBiBPimage | Am: Area of face | (Xs,Ys) (Xe,Ye):(Xsm,Ysm)<br>(Xem,Yem) Const1:1 |

Fig.31(a).

| Step | Input | Output | Parameter (unfixed) |
|---|---|---|---|
| (a) Transformation to grey scale | ERGB image | GERGB image | |
| (b) Reduction of image size | GERGB image | RGERGBB image | Mx=My=2 (Reduction rate=1/2) |
| (b) Multi-Template matching | RGERGB image<br>Eye Template1<br>Eye Template2<br>Eye Template3<br>Eye Templaten | Position: (Xe1,Ye1)<br>Position: (Xe2,Ye2) | |

| Step | Input | Output | Parameter (unfixed) |
|---|---|---|---|
| Template matching | RGERGB image<br>Eye template1 | TM1 image | Template address N |
| Template matching | RGERGB image<br>Eye template2 | TM2 image | Template address N |
| Template matching | RGERGB image<br>Eye template3 | TM3 image | Template address N |
| Template matching | RGERGB image<br>Eye template n | TMn image | Template address N |
| Max pixel selection | TM1 image<br>TM2 image<br>Tm3 image<br>TMn image | TM image | No. of image its address |
| Convolution (Smoothing2) | TM image | CTM image | Filter size: 9 |
| Max value search | CTM image | Position: (Xe1,Ye1) | (Xs,Ys) (Xe,Ye):(0,0) (127,127) |
| Set constant | CTM image | CTM0 image | (Xs,Ys) (Xe,Ye) (Xe,Ye)<--(Xe1,Ye1)<br>Const1 |
| Max value search | CTM0 image | Position: (Xe2,Ye2) | (Xs,Ys) (Xe,Ye):(0,0) (127,127) |

33(c)

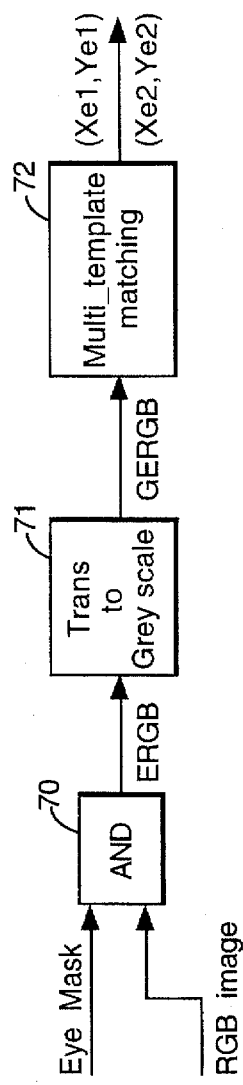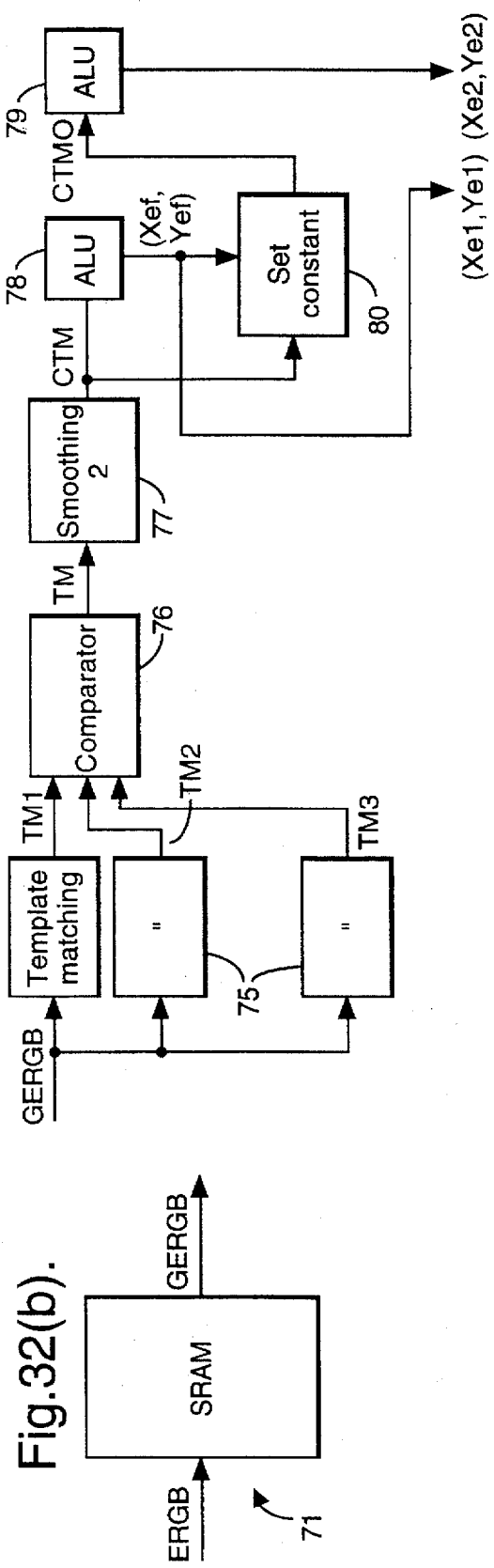

Fig.34.
INPUT image
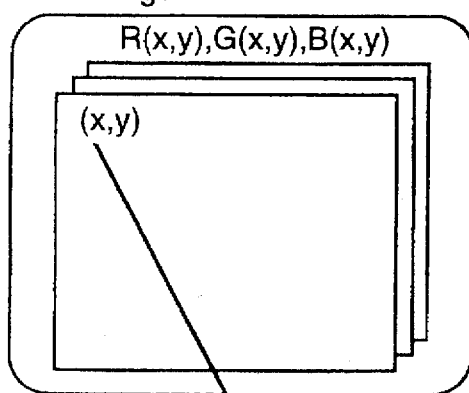
33(a)
FUNCTION
$Grey(x,y) = (R(x,y) + G(x,y) + B(x,y))/3.0$
OUTPUT image
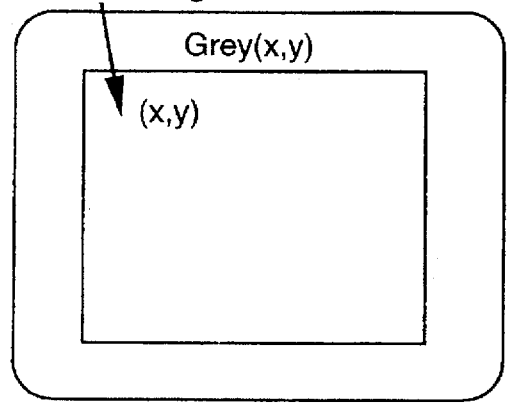
PARAMETERS
None

Fig. 37.
33(c)
INPUT image
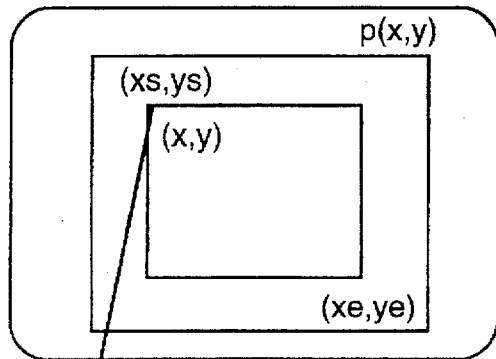
FUNCTION
If (xs<=x<=xe) and (ys<=y<=ye) then p(x,y)=const 1 else p(x,y)=original value
OUTPUT image
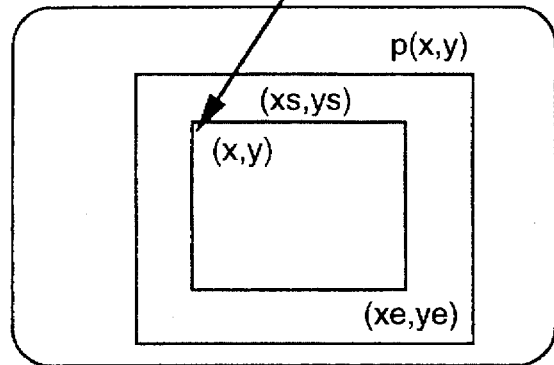
PARAMETERS
(xs,ys) (xe,ye)
Const 1

Fig.41(b).

| Processing name | Input | Output |
|---|---|---|
| Capture of the next frame image | | Input RGB image |
| Normalisation | Input RGB image | RGB image |
| Facial area detection | RGB image | Position:(Xsf,Ysf) (Xef,Yef) Area:Af |
| Consistency check | Position:(Xsf,Ysf)(Xef,Yef) Area:Af | OK/ Reject |
| Display detected area | Position:(Xsf,Ysf)(Xef,Yef) | Square box on monitor |
| Detection of facial part mask | BFimage | MouthMask EyesMask |
| Mask the input image | RGB image MouthMask | MRGB image |
| Mouth area detection | MRGB image Histogram template | Position:(Xsm,Ysm) (Xem,Yem) Area: Am |
| Consistency check | Position:(Xsm,Ysm) (Xem,Yem) Area:Af | OK / Reject |
| Display detected area | Position:(Xsm,Ysm) (Xem,Yem) Area: Am | |
| Matching with templates (time series data expressing commands | Position:(Xsm,Ysm) (Xem,Yem) Area: Am | Command | ic
METHOD AND APPARATUS FOR PROCESSING IMAGES OF FACIAL EXPRESSIONS

BACKGROUND

1. Field of the Invention

The invention relates to image processing, and more particularly to processing of images are of facial expressions.

2. Prior Art Discussion

European Patent Specification No. EP 474,307A2 (Philips) describes a method of tracking an object such as a face. An initial template of the face is formed and a mask outlining the face is extracted. The mask is then divided into a number of sub-templates which are not associated with specific features of the subject. Each successive frame is searched to determine matches. While this method appears to be effective for tracking an overall object such as a face, it does not provide the necessary data relating to state (location, orientation, open/closed status etc.) of parts of the face and other parts such as fingertips. Accordingly, it would appear to have limited applicability and not to be suitable to such tasks as automatic generation of sign language data and generation of displays to assist in understanding and communicating sign language.

An object of the invention is to provide for processing of facial images in real time to identify states of facial parts. Achievement of this objective leads to many useful applications such as sign language recognition, automatic cartoon animation, or improved human-machine interfacing for handicapped people. Another object is to provide for processing of hand images in conjunction with facial images for assistance in sign language understanding and communication, for example.

In this specification, the phrase "sign language" relates to not only what is conventionally referred to as sign language for deaf people but also to recognition of mouth movements to assist in lip reading. The term "recognition" is used in a general manner referring to a broad range of activities including full recognition of sign language to screen display of sign language movements to assist in recognition by the user. Further, the term "color" is intended to cover all colors including white, black and grey.

SUMMARY

The invention provides an image processing apparatus which comprises:

means for receiving a color facial image data stream in digital format;
   a plurality of image data processing circuits interconnected for processing the image data in a pipelining manner to provide a real time output, the circuits comprising:
       means for monitoring color values in the image data to identify image data pixels representing facial parts, and
       means for determining states of the facial parts by monitoring positional coordinates of the identified pixels; and
   an output device for outputting the determined facial part state data in real time.

Preferably, the processing circuits comprise means for monitoring frequency of occurrence of pixel values in the image data.

In one arrangement, the monitoring means comprises means for carrying out three-dimensional color histogram matching to monitor frequency of occurrence of pixel values in the image data.

Preferably, the processing circuits comprise:
   a facial area detection unit comprising circuits for carrying out facial area detection operations on the image data; and
   a facial part detection unit connected to said facial area detection unit and comprising processing circuits for determining states of a facial part within the detected facial area using the image data and an output signal from said facial area detection unit.

In another aspect, the invention provides a method of processing facial image data, the method comprising the steps of:
   receiving a digital color image data stream;
   monitoring color values in the image data to identify image data pixels representing facial parts;
   determining states of the facial parts by monitoring positional coordinates of the identified pixels, said monitoring and determining steps being carried out by processing circuits interconnected for processing the image data in a pipelining manner; and outputting in real time a signal representing the determined facial part state data.

BRIEF DESCRIPTION OF THE DRAWINGS

The invention will be more clearly understood from the following description of some embodiments thereof, given by way of example only with reference to the accompanying drawings, in which:

FIG. 2(a) is an overview flow chart of a method carried out by the system and FIG. 2(b) is a table showing processing parameters in the flow chart;

FIGS. 3(a), (b) and (c) are diagrams illustrating normalization of a captured RGB image;

FIG. 4 is a flow diagram showing facial area detection steps and processing parameters;

FIGS. 5 to 9 inclusive are block diagrams showing a facial area detection unit of the system;

FIGS. 10 to 21 inclusive are diagrams showing in more detail the manner in which the steps of FIG. 2(a) for facial area detection are carried out;

FIG. 22 is a flow diagram showing colored fingertip detection steps;

FIGS. 24 and 25 are diagrams showing some colored fingertip detection steps in detail;

FIG. 30 is a flow diagram showing mouth area detection steps;

FIGS. 31(a) and (b) are flow diagrams showing eye area detection steps;

FIGS. 32(a), (b), (c) and 33 are block diagrams showing a unit for eye area detection;

FIGS. 34 to 37 are diagrams showing eye area detection steps in more detail;

DETAILED DESCRIPTION OF SOME EMBODIMENTS

Figure 1A:
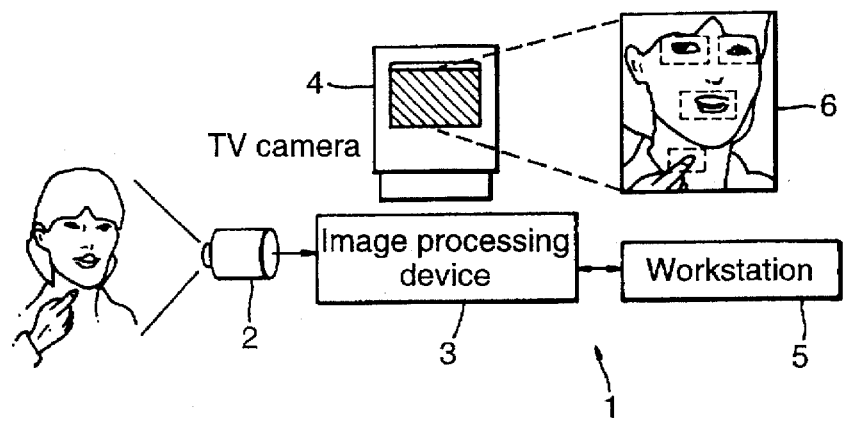
FIGS. 1(a), 1(b) and 1(c) are outline views of an image processing system of the invention.
Figure 1B:
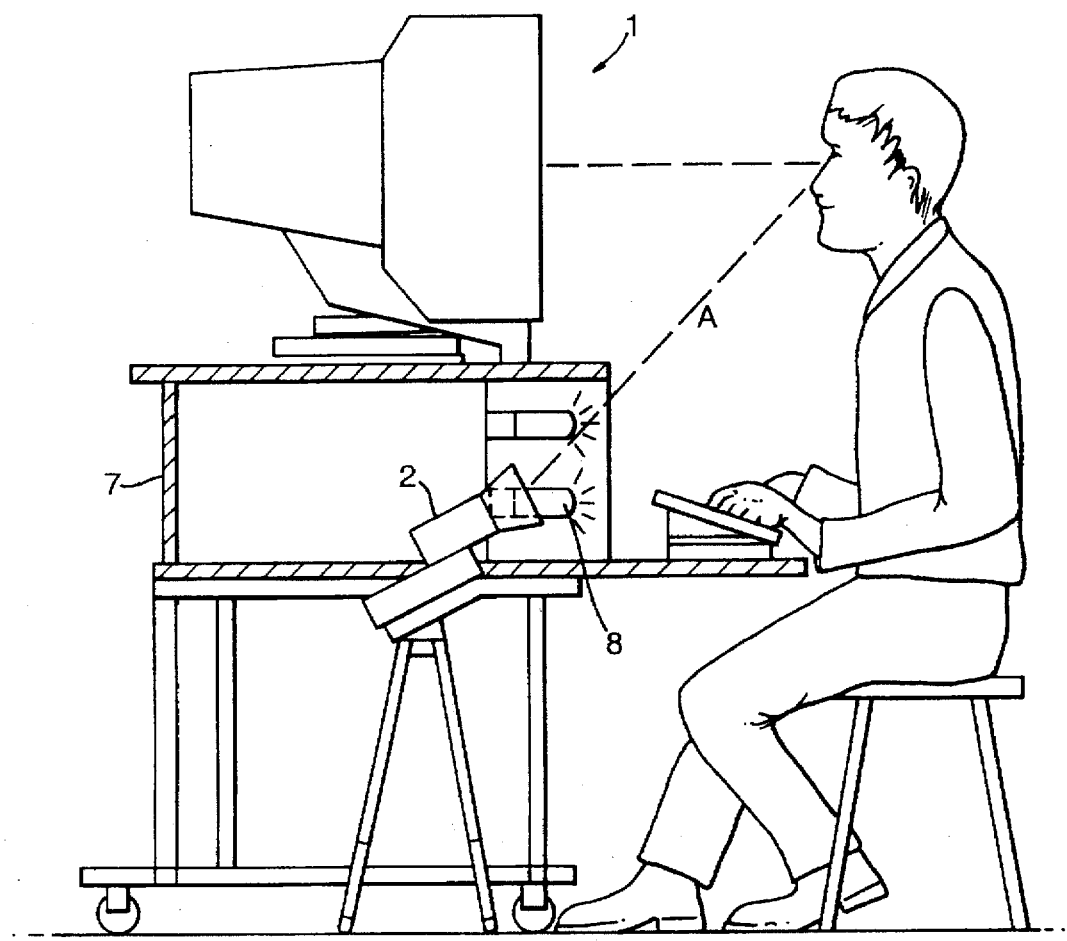
Figure 1C:
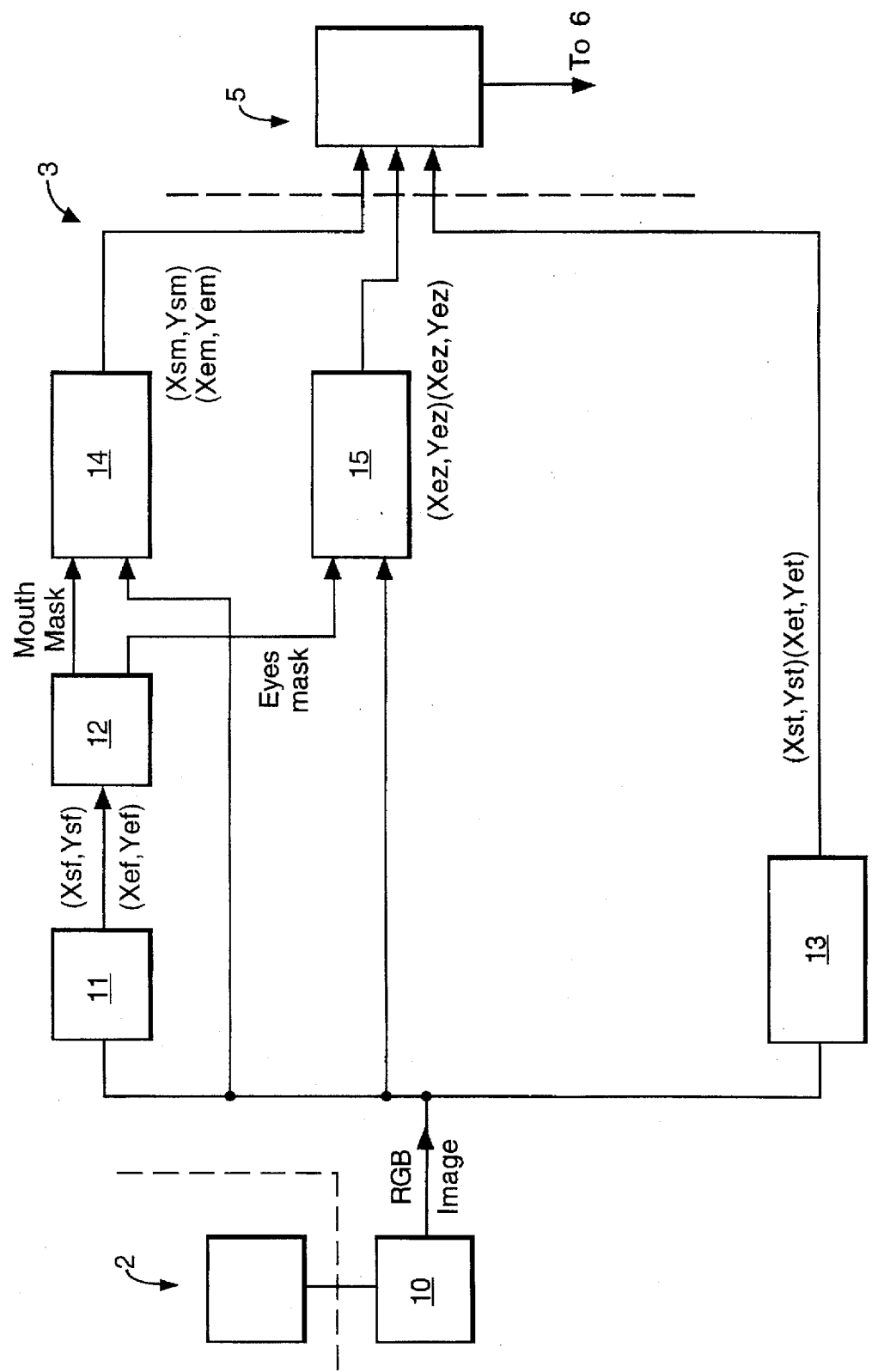

Referring to the drawings, and initially to FIGS. 1(a), 1(b) and 1(c), there is shown an image processing system 1 of the invention. The system 1 comprises a video camera 2 connected to an image processing device 3 controlling a video screen 4. The device 3 is connected to a workstation 5 having processing circuits to assist in decision-making in the system 1. The primary purpose of the system 1 is to monitor movement of facial parts and to provide information on the proximity of a person's fingertips to facial parts. These are important aspects of sign language. A sample screen display 6 is shown in FIG. 1(a). FIG. 1(b) shows an effective arrangement for the camera 2 whereby it is mounted on a frame 7 next to a light source 8 at a lower level than the subject's face and is directed upwardly in the direction of the line A. This ensures that the face is always in the field of view, even when the subject's head has been lowered.

The system 1 operates to identify facial parts and fingertips and determines states for them according to their locations, orientation, open/shut status etc. This data is generated in real time and the system 1 is therefore useful for such applications as:

(a) sign language recognition, where the positional relationship of the fingertip to facial feature helps to determine the sign gesture, (b) automatic cartoon animation, where cartoon characters can be generated in real-time using the results of the identification to give realistic facial gestures, and (c) human-machine interfacing, where the facial part movement such as that of the eyes can be used to control a screen cursor, and where the movement of the mouth could be used to act as a switch, for use in applications where the user only has control of facial part movements.

Referring now to FIG. 1(c) in particular, the general construction of the system 1 is illustrated. The camera 2 is connected to the device 3 at a normalization unit 10 which is for elimination of noise caused by the ambient illumination conditions. An RGB image is outputted by the normalization circuit 10 to a sub-system comprising units 11 and 12 for detection of facial area and for generation of facial part masks. The normalization unit 10 also delivers RGB image input signals to a fingertip detection unit 13.

The facial part mask unit 12 is connected to provide masking data to both a mouth area detection unit 14 and an eye area detection unit 15. The units 13, 14, and 15 are all connected at their outputs to the workstation 5 which automatically interprets sign language signal content of the received data. The output signal may be used as desired, according to the particular application.

Before describing construction and operation of the system 1 in detail, important functional aspects are now briefly described. The input is a stream of digital color (in this case RGB) image data and this is processed by the circuits in the various units in a pipelining manner i.e. successive operations are carried out on one or more data streams, individual operations being relatively simple. Processing in this manner helps to achieve real time processing. Accordingly, the output data may be used very effectively for a number of applications, some of which are outlined above.

Another important aspect is that the major units in the device 3 each include circuits which fall into two main categories, namely monitoring and determining circuits. The monitoring circuits monitor the color values of the image data stream (and more particularly, pixel value frequencies) to identify subjects, while the determining circuits use this data to determine position and area data for the subjects. For the unit 11 the subject is the facial area generally, for the unit 13 a colored fingertip, for the unit 14 the mouth area, and for the unit 15 the eyes. In other embodiments, there is only facial area and mouth area detection, however the underlying technical features remain the same. The arrangement of units providing general followed by specific subject image data processing also helps to reduce complexity and achieve real time processing. Another important feature is provision of mask data between the general and specific subsequent processing, in this embodiment generated by the unit 12. This improves efficiency of subsequent processing.

Instead of a camera, the primary image signal may be provided by any suitable video device such as a video tape player. The digital image data may alternatively be received from an external source, which may be remote.

Referring now to FIGS. 2-37 operation of the system 1 is now described in detail. The overall method of operation is illustrated in flow chart format in FIGS. 2(a) and 2(b).

In step 20 of the method, the next frame image is captured by writing an analog pixel stream in the camera 2 between synchronisation pulses to an image memory via an A/D converter within the camera 2. This provides the initial digital input RGB image signal.

In step 21, normalization takes place. This involves inputting the captured RGB image to a large look-up table in SRAM as illustrated in FIG. 3(a) and generating a normalized RGB signal image by translation of the RGB value of each pixel according to the formulae of FIG. 3(b) or FIG. 3(c). The look-up table is pre-coded with coefficients for translation of the RGB values. The coefficients of the look-up table are calculated using either of two functions given in FIGS. 3(b) and 3(c). The 24 bit RGB image data is made of up of three 8 bit values, one representing R, one representing G, and one representing B. These three values are combined for one 24 bit address into the look-up table. Using the formulae, it is possible to calculate new 8 bit values representing Normalized R, Normalized G, and Normalized B. These three 8 bit data values are combined to form a single 24 bit data signal which is outputted as the Normalized RGB image. The coefficients are pre-coded into the table and down-loaded into the coefficients during initialisation to the SRAM 10. Alternatively, they may be pre-coded by programming the coefficients into a PROM at time of manufacture.

Where it is desired to use less memory a more complex circuit having a number of smaller look-up tables having discrete logic could be used, whereby processing is broken down into several steps. This arrangement requires less memory but provides a lower resolution.

In step 22 the facial area of the captured image is detected by the unit 11. Step 22 is illustrated in more detail in FIG. 4 in which the steps 22(a) to 22(n) are shown and processing parameters are indicated. The facial area detection unit 11 is shown in more detail in FIG. 5. The unit 11 comprises a 3D histogram and backprojection circuit 51 connected to a smoothing #1 circuit 52. The former circuit is shown in detail in FIG. 6, the latter in FIG. 7(a).

Operation of the circuit 51 can be divided into three phases of operation, namely X, Y and Z. The operation is as follows.

Phase X

The input image is routed via a multiplexor (MUX) to a memory (MEM) which is used to store an Image Color Histogram. The pixel values are used as an address to look-up a histogram value which is loaded in a COUNTER. The counter is then incremented to indicate that another pixel whose value is within this histogram box has been encountered, and then this value is re-written back into the Image Color Histogram memory. This process is repeated until all pixels in the input image have been processed. A histogram of the pixel values now resides in the Image Color Histogram memory. It should be noted that this memory must be initialized to zero at the start of each frame.

Phase Y

In this phase an Internal Addr Gen is used to provide a memory address to the Image Color Histogram memory and a Model Color Histogram memory. The Model Color Histogram is loaded with a histogram of the model color off-line, using a workstation to down-load the values into memory. The multiplexor is set so that the Internal Addr Gen impinges upon the Image Color Histogram. The Internal Addr Gen generates address for all of the histogram boxes and simultaneously the value for the Image Color Histogram and the Model Color Histogram are output to the Divider Unit. The Divider Unit, which can be either an ALU or a LUT, divides these two numbers and stores the result in a Ratio Color Histogram memory. The address for the Ratio Color Histogram memory is also supplied by the Internal Addr Gen via another multiplexor (MUX). The process continues until all boxes in the histogram have been processed.

Phase Z

In this phase the address to the Ratio Color Histogram memory is supplied by the pixel values in the original input image, using the multiplexor. The input image is used to look-up the ratio histogram values and output these values to the next processing stage.

Figure 5:
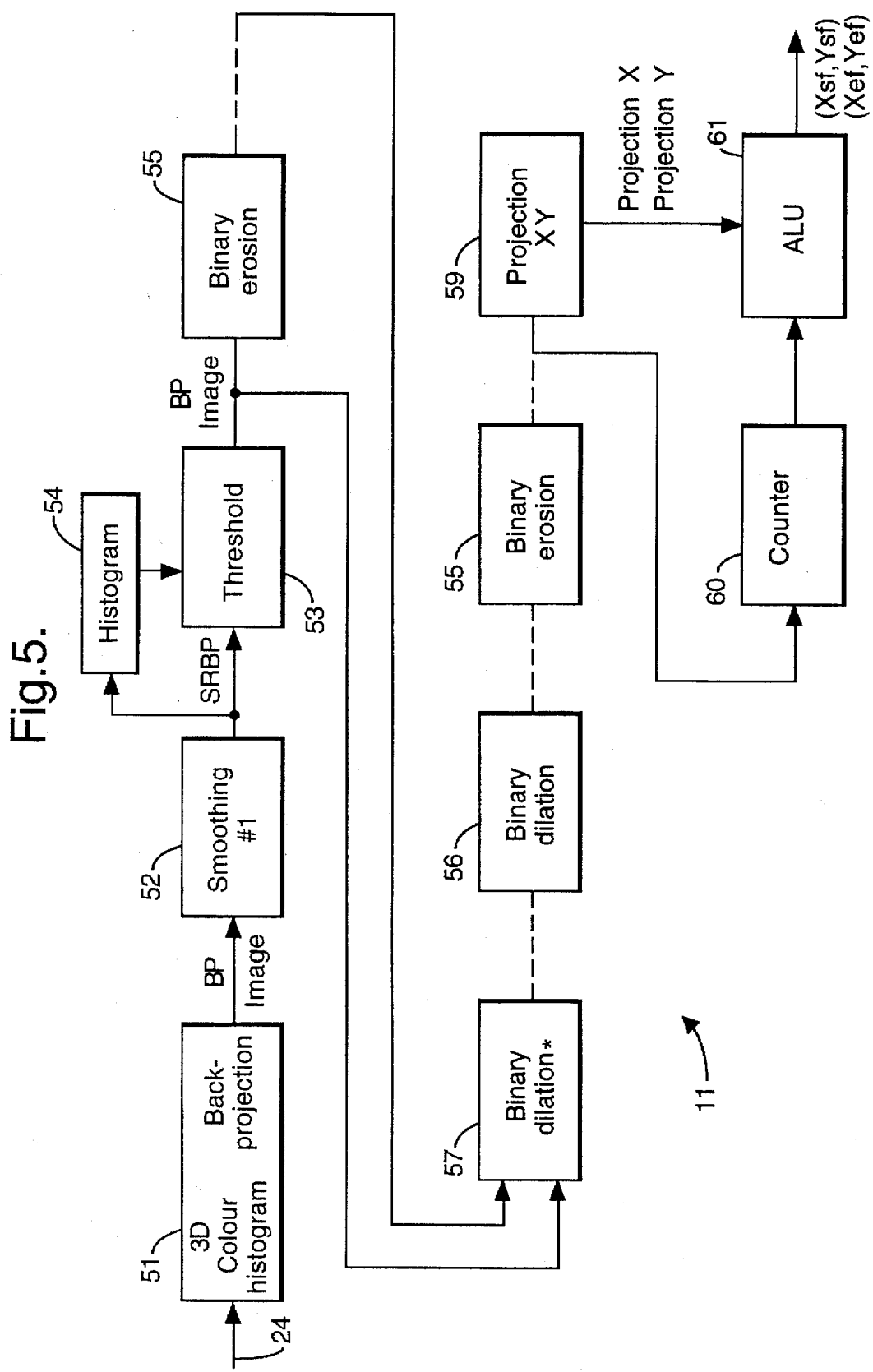
Figure 6:
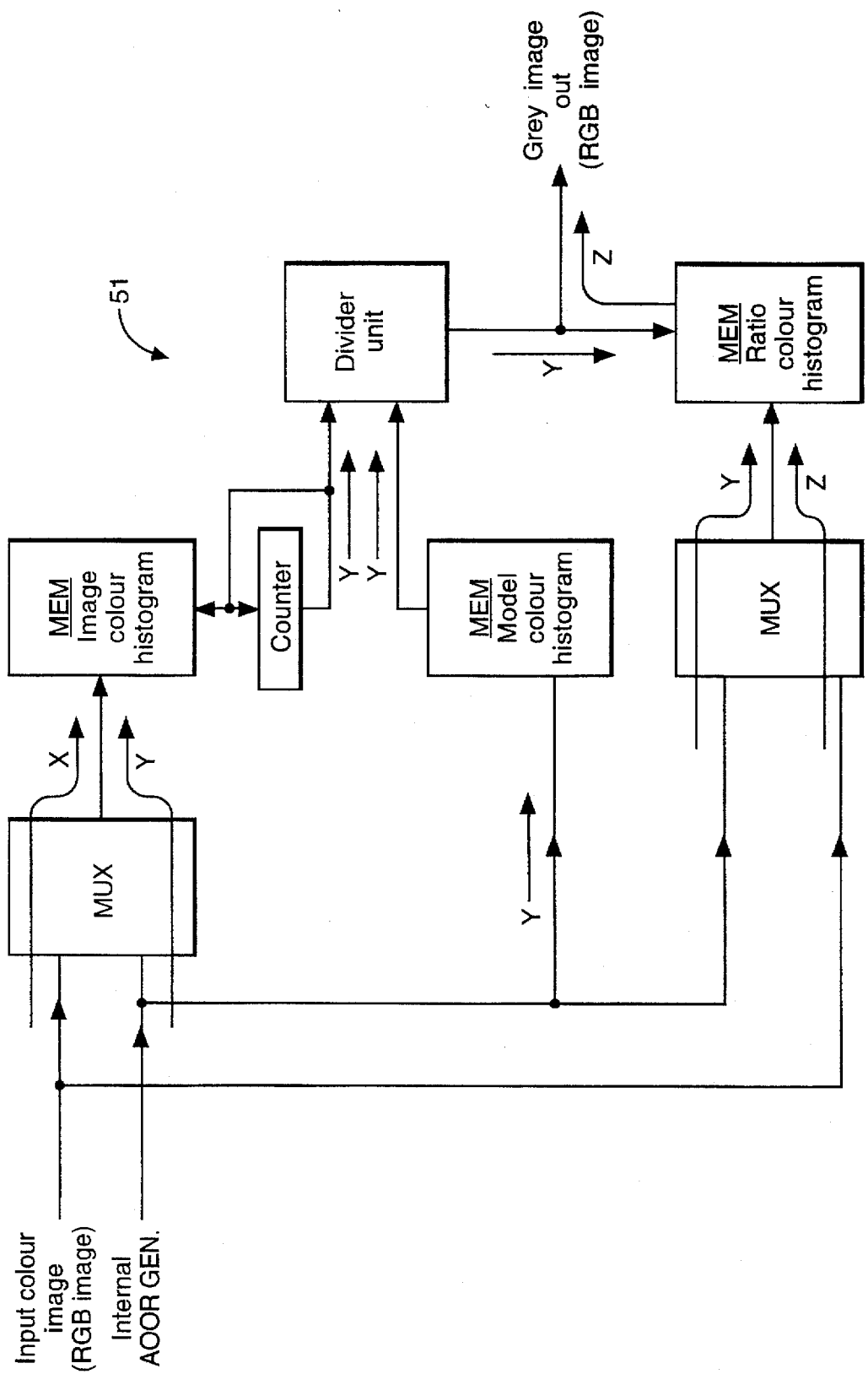
Figure 9:
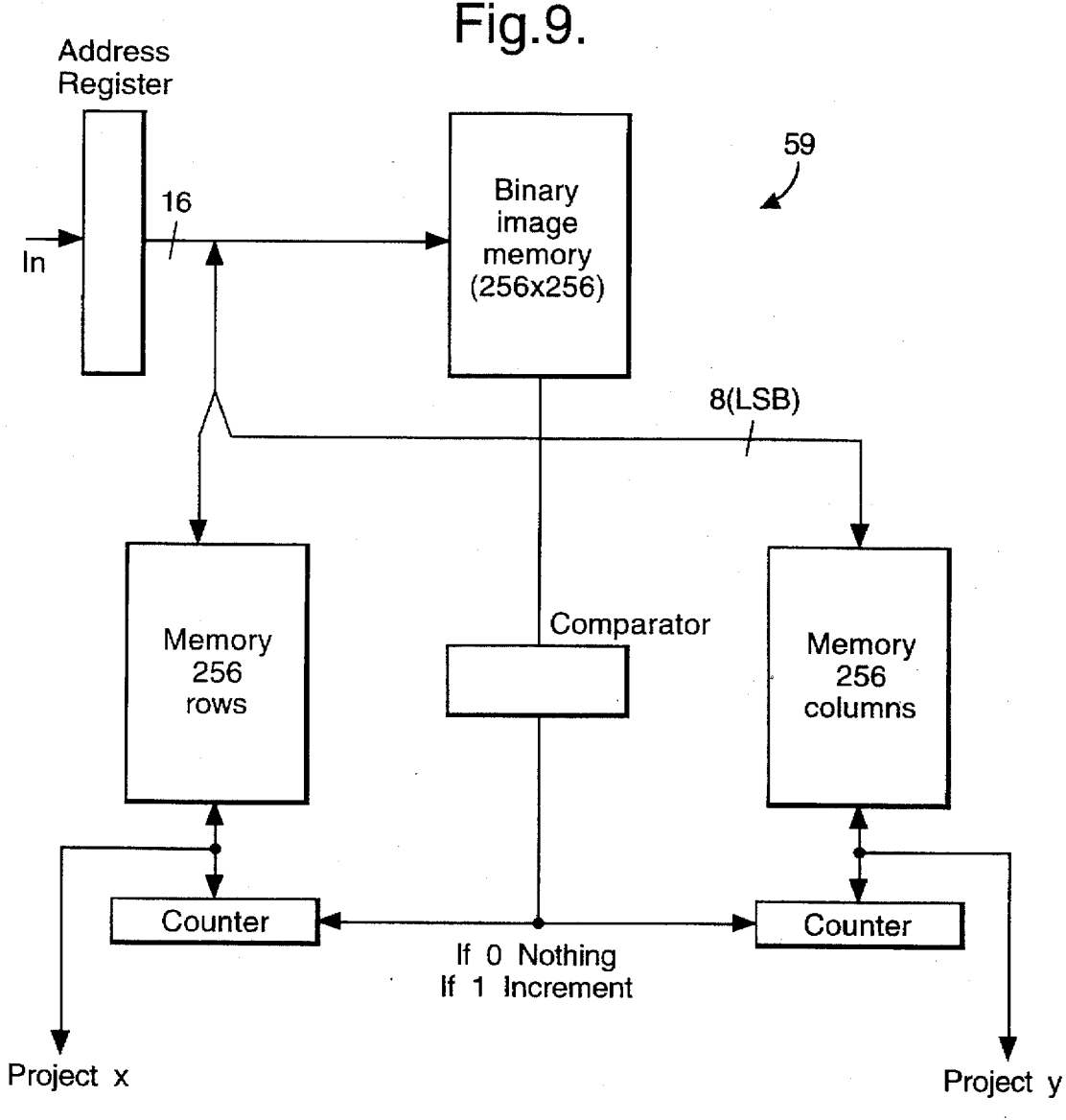

A histogram circuit 54 (shown in detail in FIG. 7(b)) and a threshold circuit 53 (shown in detail in FIG. 7(c)) are connected to a binary erosion circuit 55 (see FIG. 8(a)). The unit 11 further comprises a binary dilation circuit 56 similar to the binary erosion circuit 55, and a binary dilation circuit * 57 (see FIG. 8(b)) There is also a projection X-Y circuit 59 (see FIG. 9). Finally, the unit 11 comprises a counter 60 and an ALU 61. The signal flows between these circuits are illustrated in FIG. 5, in which the binary erosion circuit is shown twice for conformity with the signal flows.

Figure 10:
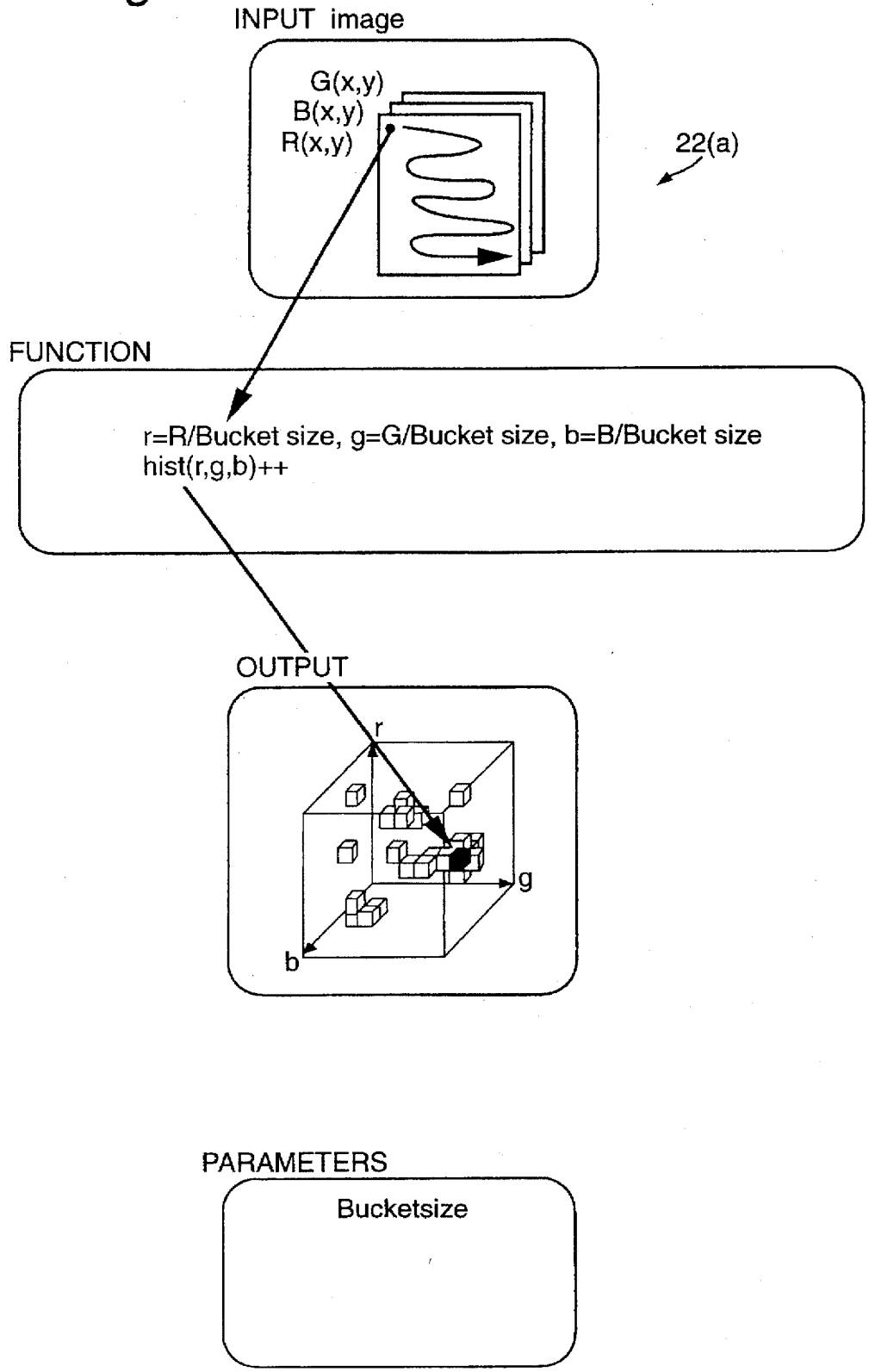

The normalized input image signal has R, G and B components, the position in the data stream representing the x, y position. The RGB image signal is inputted to the circuit 51 and the RGB data is separated as shown in FIG. 10 into its R, G and B components. Using the component values, a histogram of color space is derived by incrementing the particular box the RGB values point to. The function of the 3D histogram is to indicate the relative frequency that one part of the 3D space occupied in relation to another part of the same 3D space. In this example the 3D space represents RGB color space, with the value (0,0,0) indicating black, and (255,255,255) indicating white. If the input image was only white, and the Bucket size is set to 1, then all boxes except (0,0,0) will be zero. The function of the variable Bucket Size is to allow a group of similar colors to be represented by a single box. This reduces the number of boxes in the 3D histogram and therefore reduces the complexity of the implementation.

Figure 11:
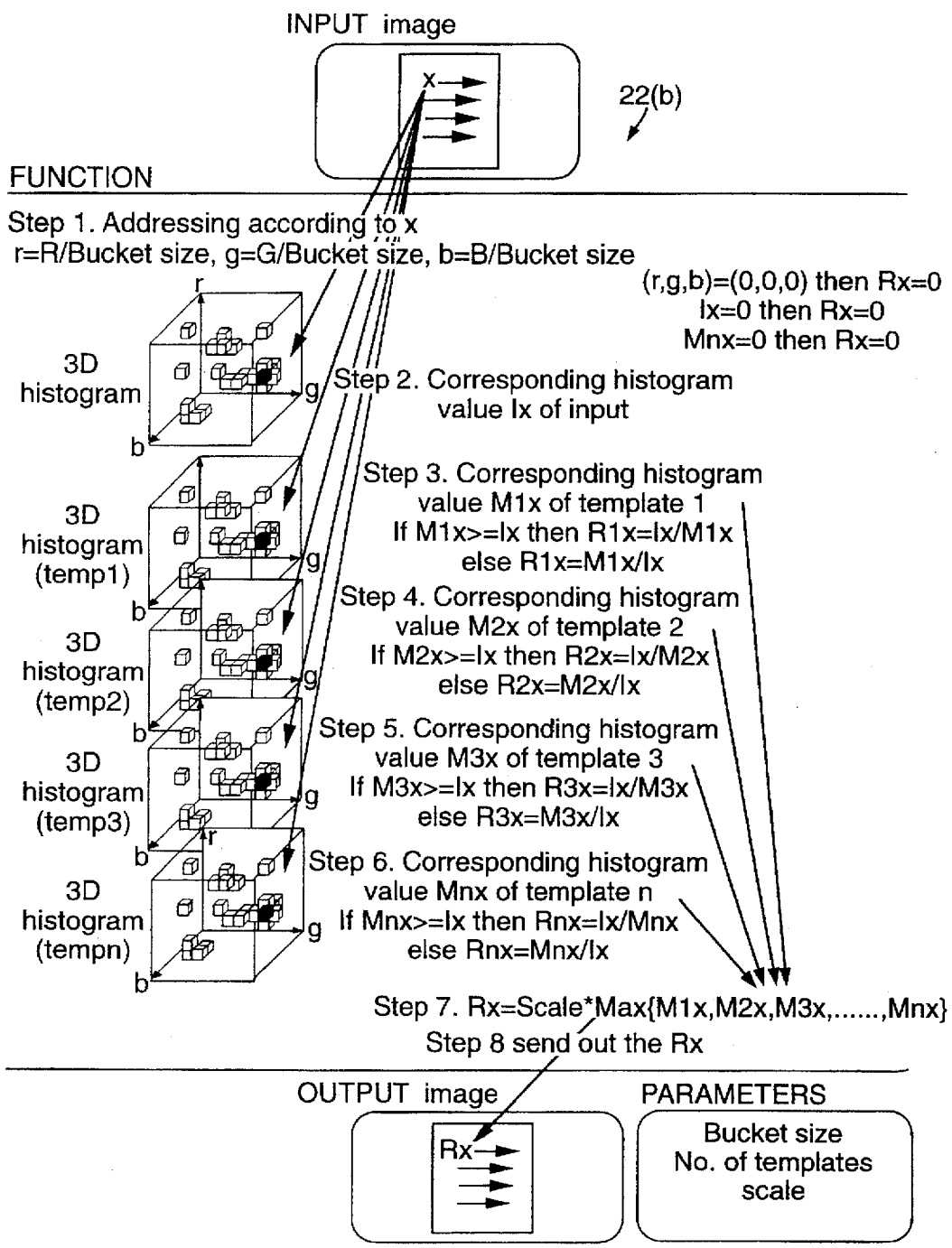

After all pixels in the input image are processed, the box in the histogram which has the highest value represents the color (or colors, if the box in the histogram covers more than a single, discrete color) which occur most frequently in the input image. The second highest value represents the second most frequent color, and so on. In backprojection as shown in FIG. 11 the resulting histogram is then compared with a template histogram of the facial part which is to be identified to provide an output BP signal which indicates the degree of possibility that the pixel is in the facial area. A 3D color histogram of the mouth template is calculated off-line. The resulting histogram represents the frequency of colors within the template image. Those boxes which have colors which are highly representative of the mouth have high values, whilst those boxes which contain no representative contain zero. By dividing the template histogram value by the resulting histogram value in those boxes where the template histogram value is greater than the resulting histogram value, and by dividing the resulting histogram value by the template histogram value in those boxes where the template histogram value is less than the resulting histogram value, a new ratio histogram can be formed which indicates which colors in the input image are likely to belong to the mouth. Finally by using the input RGB image as a look-up address into this ratio histogram, an output image can be formed which highlights those pixels which are most likely to belong to the mouth.

The next step (also carried out by the circuit 51) is reduction of the image size by sub-sampling the pixel stream to reduce complexity of processing as shown in detail in FIG. 12. This step involves the circuit 51 carrying out sum and average operations on the input image.

Figure 13:
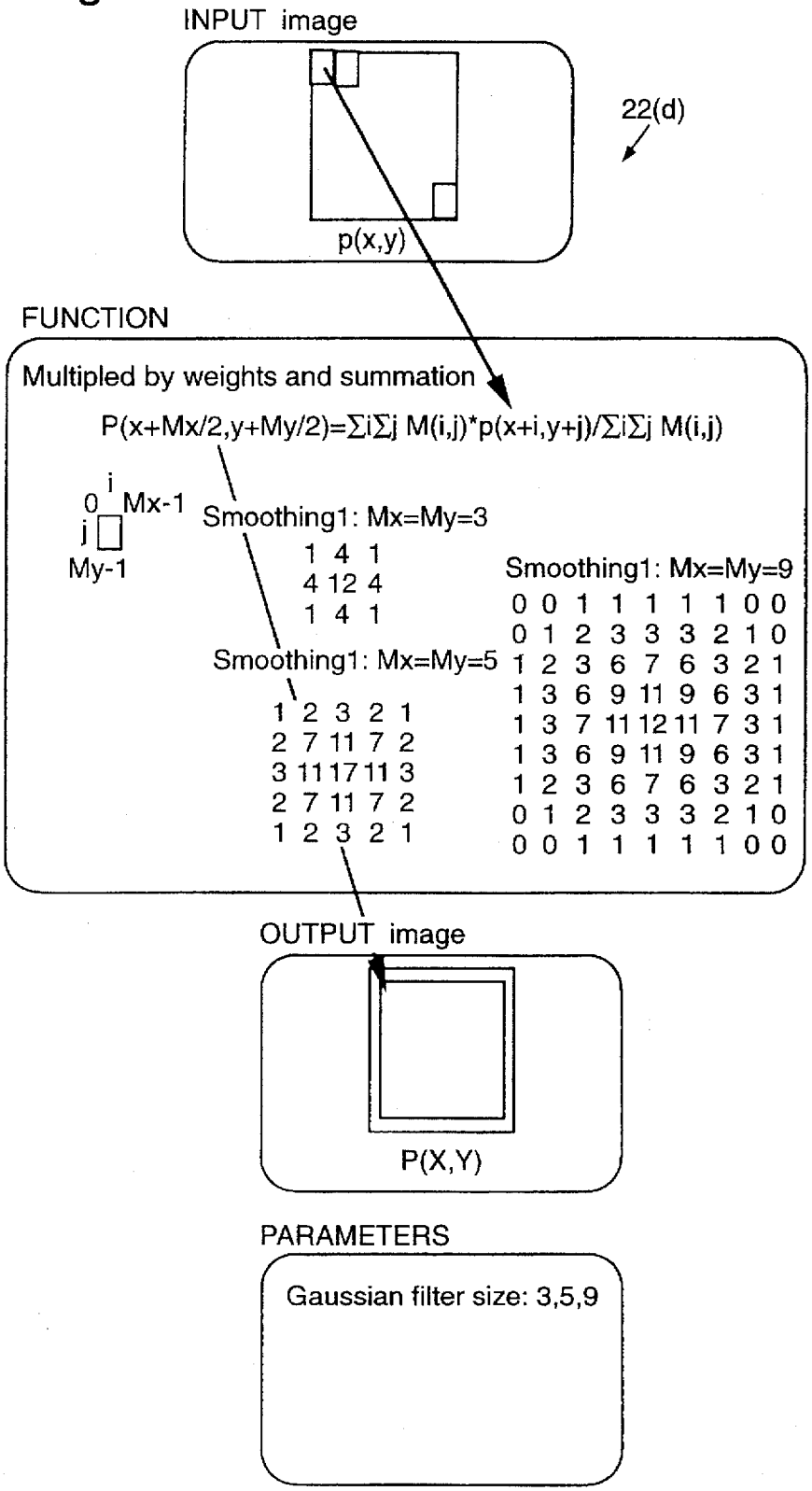

The circuit 52 then carries out smoothing operations as shown in FIG. 13 to reduce noise and increase the reliability of the correct threshold function. This involves convolution in which there is multiplication by weights and summation. In more detail, the function of the circuit 52 is to obtain an average value over a group of pixels, whose central pixel is used as the reference pixel. In the simplest case, all pixels are summed and then divided by the number of pixels. This is equivalent to multiplying all pixels by a coefficient of 1 and then summing. However, there are a multitude of smoothing algorithms where the unitary coefficients can be replaced with weight coefficients so that pixels closest to the reference pixel have greater influence on the result than those further away. FIG. 13 shows some typical examples.

Operation of the circuit 52 can be explained in the following way. The input image enters the circuit shown in FIG. 7(a) at the beginning of the 256 bit shift register. If the correlation surface is N×M, then there are M 256 bit shift registers and N delay elements in each row. The function of each delay element is to simply store a pixel value for 1 clock cycle and then pass it to the next day elements. Each output from the delay elements is multiplied by a Constant, which are loaded into circuit 52 off-line using the workstation. The results from all of these multiplications are then summed before being outputted.

Figure 14:
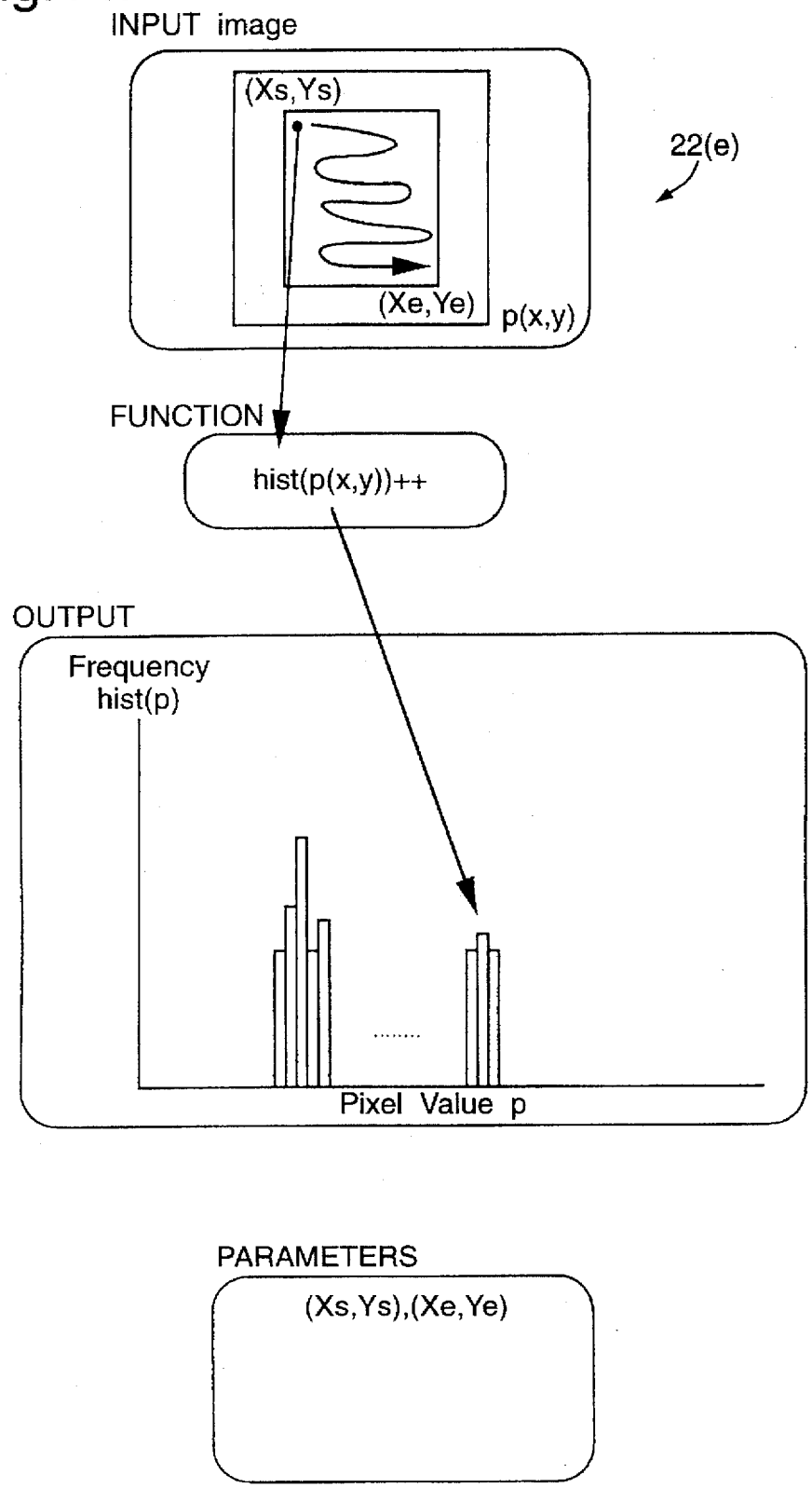
Figure 15:
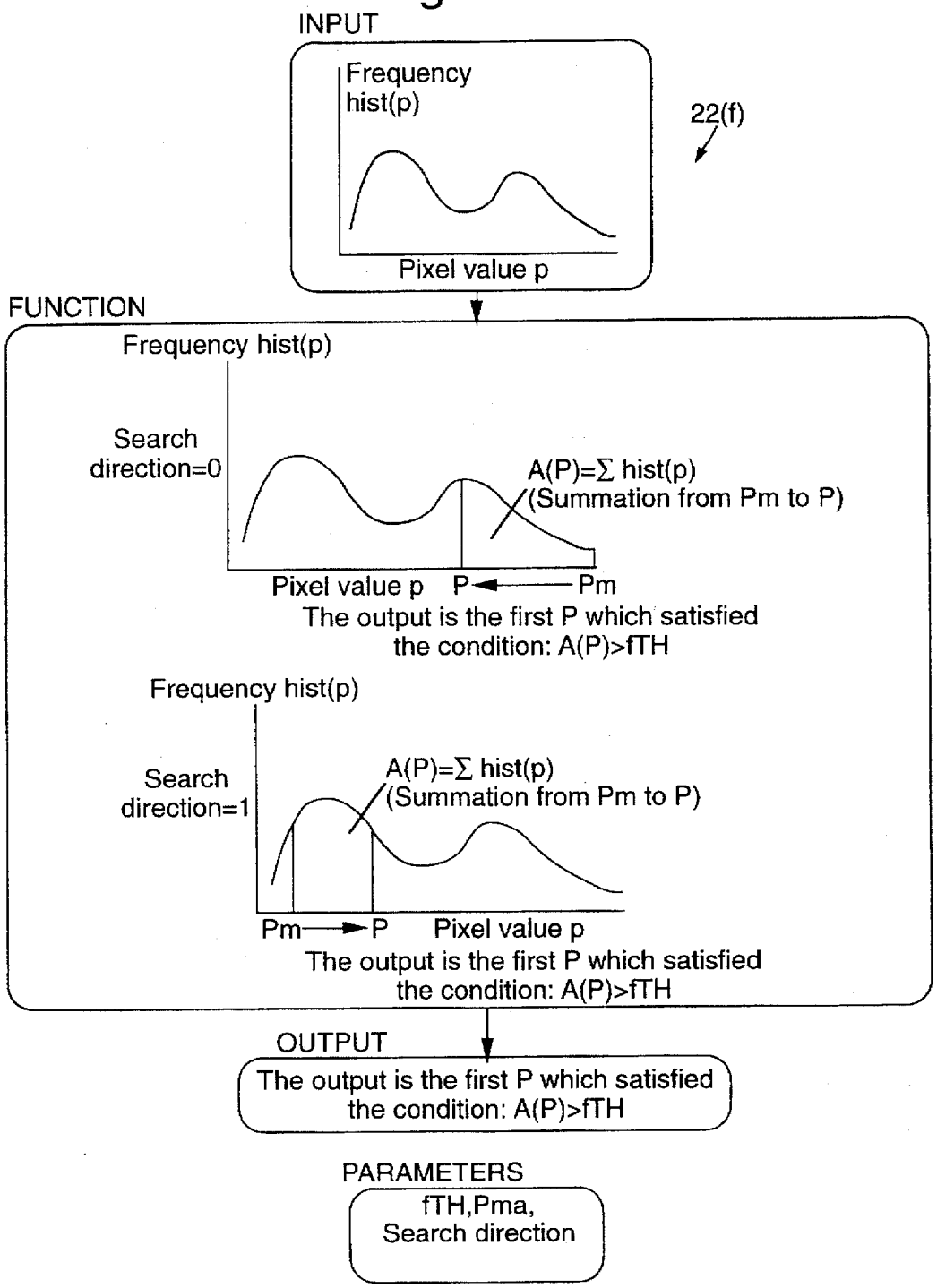
Figure 16:
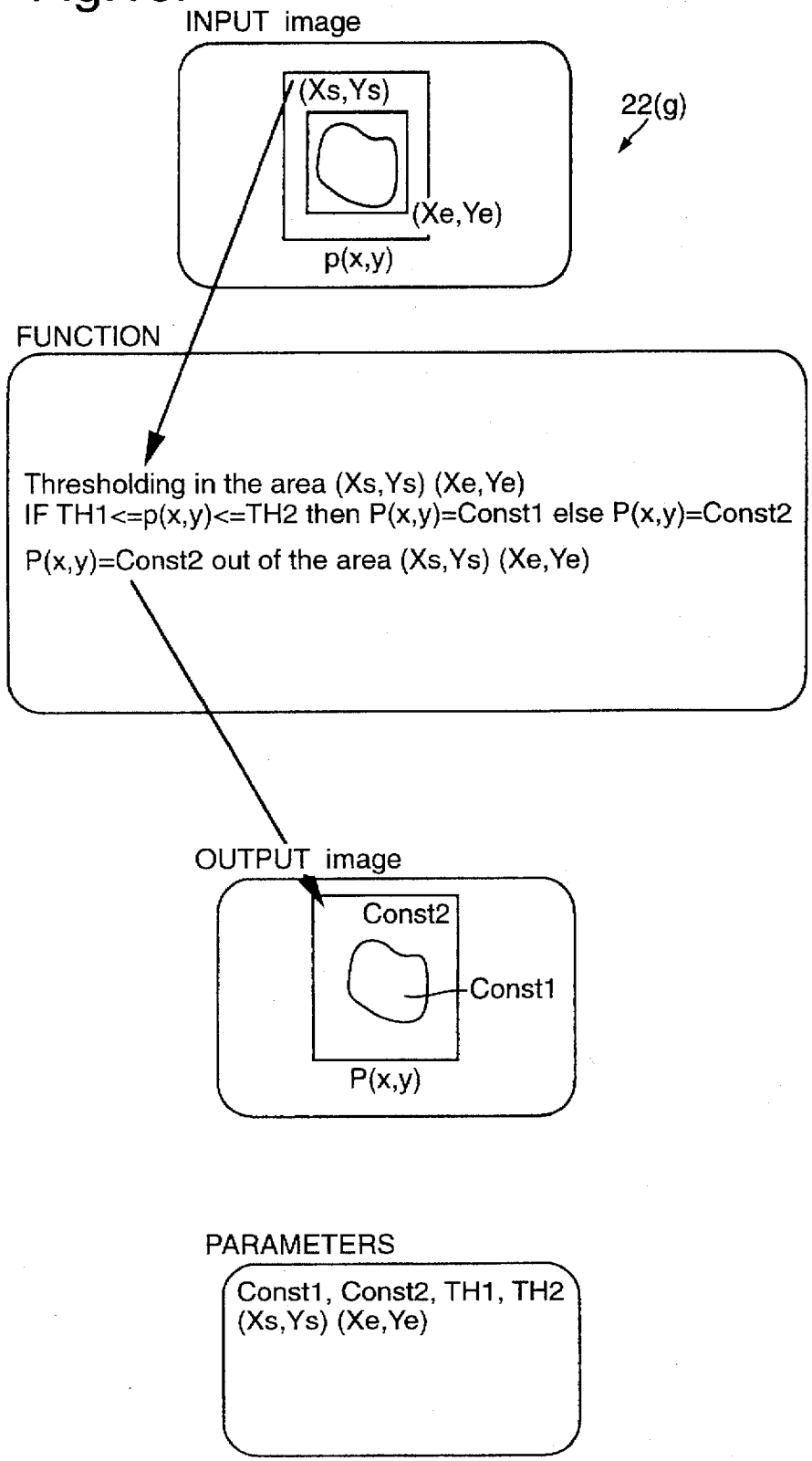

The circuits 54 and 53 (shown in FIGS. 7(b) and 7(c)) then generate a histogram as shown in FIG. 14 to obtain the threshold, the output being a set of values of frequency against pixel values as shown in FIG. 15. There is then thresholding in the area (Xs,Ys), (Xe,Ye) to generate a binary BP image as shown in FIG. 16. The sub-script "s" represents start, "e" representing end. As FIG. 14 shows, the function of the circuit 54 is to build a histogram of the pixel values, with the most commonly occurring pixel value having the highest frequency. An implementation is shown in FIG. 7(b) where the pixel value is used as an address to a SRAM to look-up the number of times the pixel value has occurred. This value is then loaded into a counter where it is incremented and then written back into the SRAM. After all pixels have been inputted into the circuit 54 and histogram values calculated, the histogram values are read into an ALU (Arithmetic Logic Unit) in the circuit 54 where a threshold value is calculated. In the circuit 54, the ALU is used to search for the maximum value by reading every histogram value in the SRAM. When the maximum value has been found it is then multiplied by a constant, usually less than 1, to produce a threshold value which is outputted to the next processing stage.

The circuit 53, shown in FIG. 7(c) takes as input the pixel stream and using a comparator compares each pixel against the threshold calculated in the circuit 54. If the pixel value is greater than or equal to the threshold the comparator outputs a 1, else 0. In this fashion, a binary image is formed.

Figure 18A:
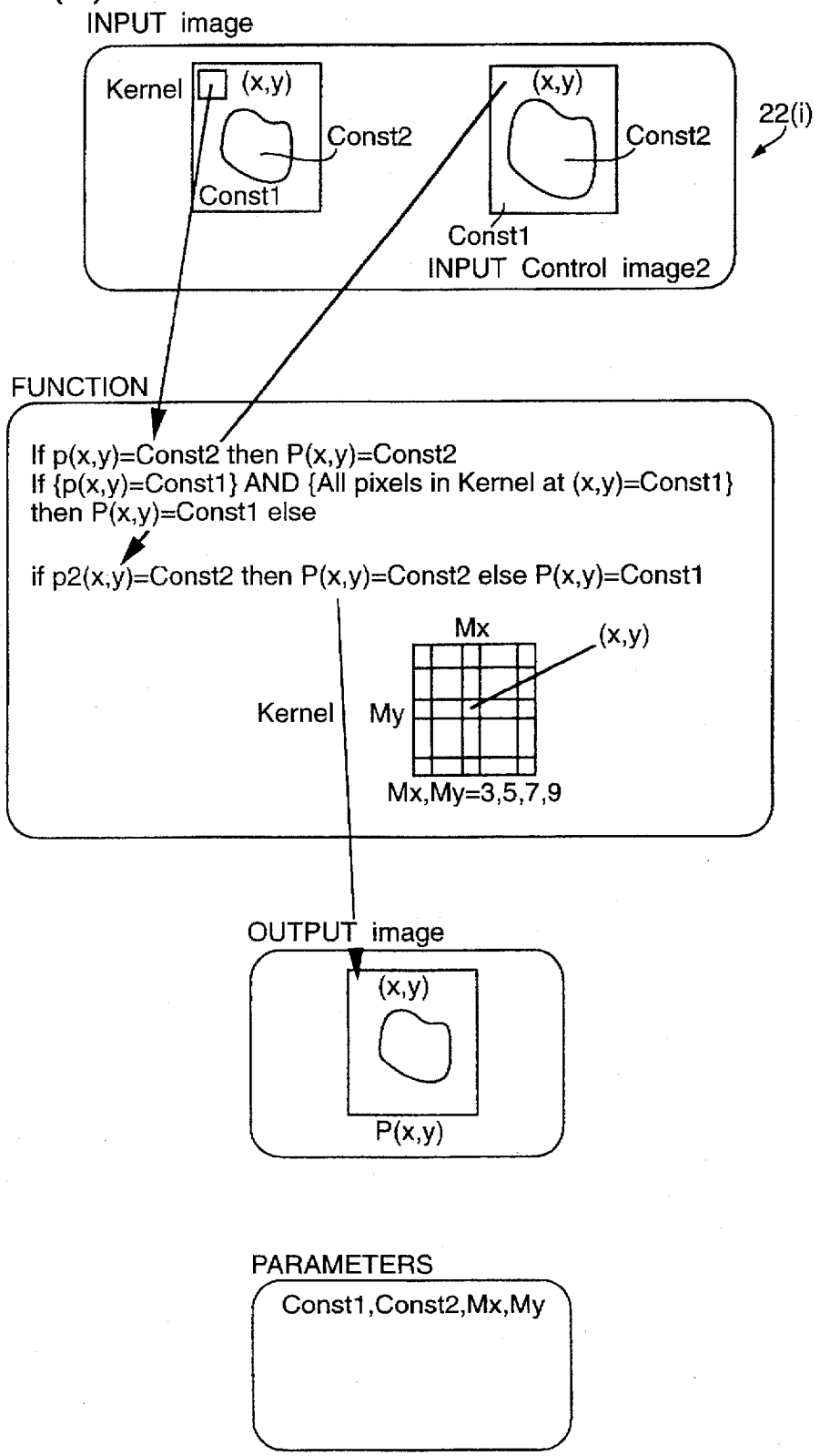
Figure 20:
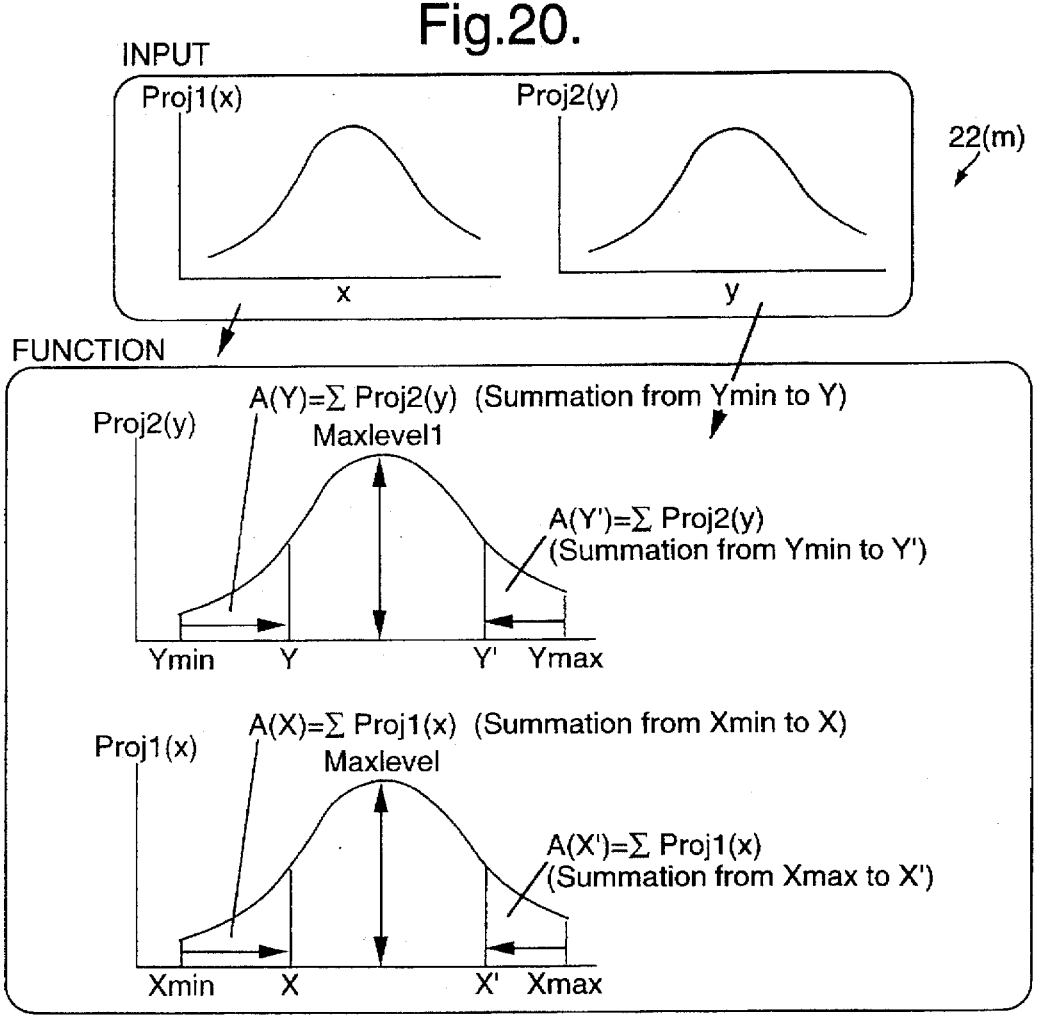

The circuit 55 then carries out binary erosion as shown in FIG. 17 to eliminate random noise from the image data. This is followed by binary dilation as shown in FIGS. 18(a) and 18(b) to recover the area size. These steps are followed by a further binary erosion step as shown diagrammatically in FIG. 5.

The circuit 59 then carries out projection operations to generate projection X and projection Y values for the facial area as shown in FIG. 19 to obtain the position of the final area edges. A projection search is then carried out by the ALU 61 to check representation of the pixels after binary erosion to generate location coordinates (Xsf,Ysf) (Xef,Yef) the sub-scripts indicating the coordinates of a box in which the face is located in the image.

Finally, area counting by the counter 60 as shown in detail in FIG. 21 takes place to generate a value for the area of the face. This signal is outputted to the unit 12. The data which is outputted includes the area where the face is to be found in the image.

Referring again to the overall flow chart of FIG. 2, a consistency check 23 is carried out by the ALU 60 whereby the position and area values generated in the facial area detection step 22 are monitored for consistency and an accept or reject signal is generated. The criteria used is the area of the identified box. If the area of the box is zero or very small (of the order of only several pixels) this indicates that no face was found in the image. In this event, there is no need to proceed with any additional processing with this frame and therefore the next frame can be processed.

In step 24 the detected area is displayed and this appears in a square box on the screen 4.

In step 25 there is colored fingertip detection, the sub-steps 25(a) to 25(m) being illustrated in detail in FIG. 22. The input is the normalized RGB image and the output is a set of position and area values, as with the facial area detection step 22.

Figures 23A, 23B:
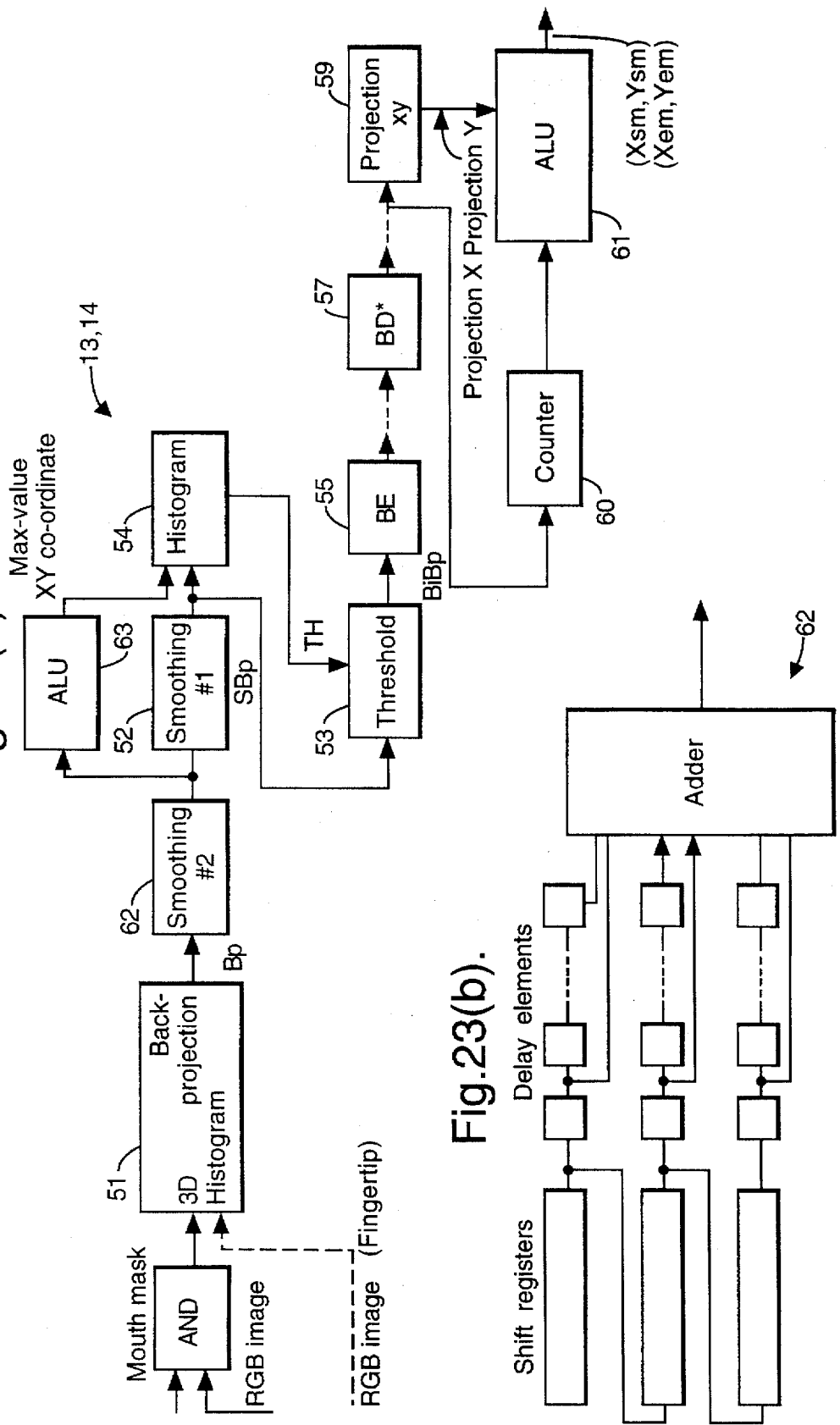
FIGS. 23(a) and 23(b) are block diagrams of a unit for colored fingertip and mouth area detection.

The unit 13 to implement these steps is shown in FIG. 23(a) in which parts similar to those described with reference to FIG. 5 are identified by the same reference numerals. The unit 13 is similar to the mouth area detection unit 14, and indeed the relevant inputs are both indicated, the separate RGB image inputs being indicated by interrupted lines. The unit 13 has an additional smoothing #2 circuit 62, illustrated in FIG. 23(a) and which operates as shown in FIG. 24. There is an additional input to the histogram circuit 54 from an ALU 63 to restrict the area which the histogram is made from. Smoothing #2 and the additional input to the histogram circuit 54 may not be required if quality of the data input is high.

Figure 25:
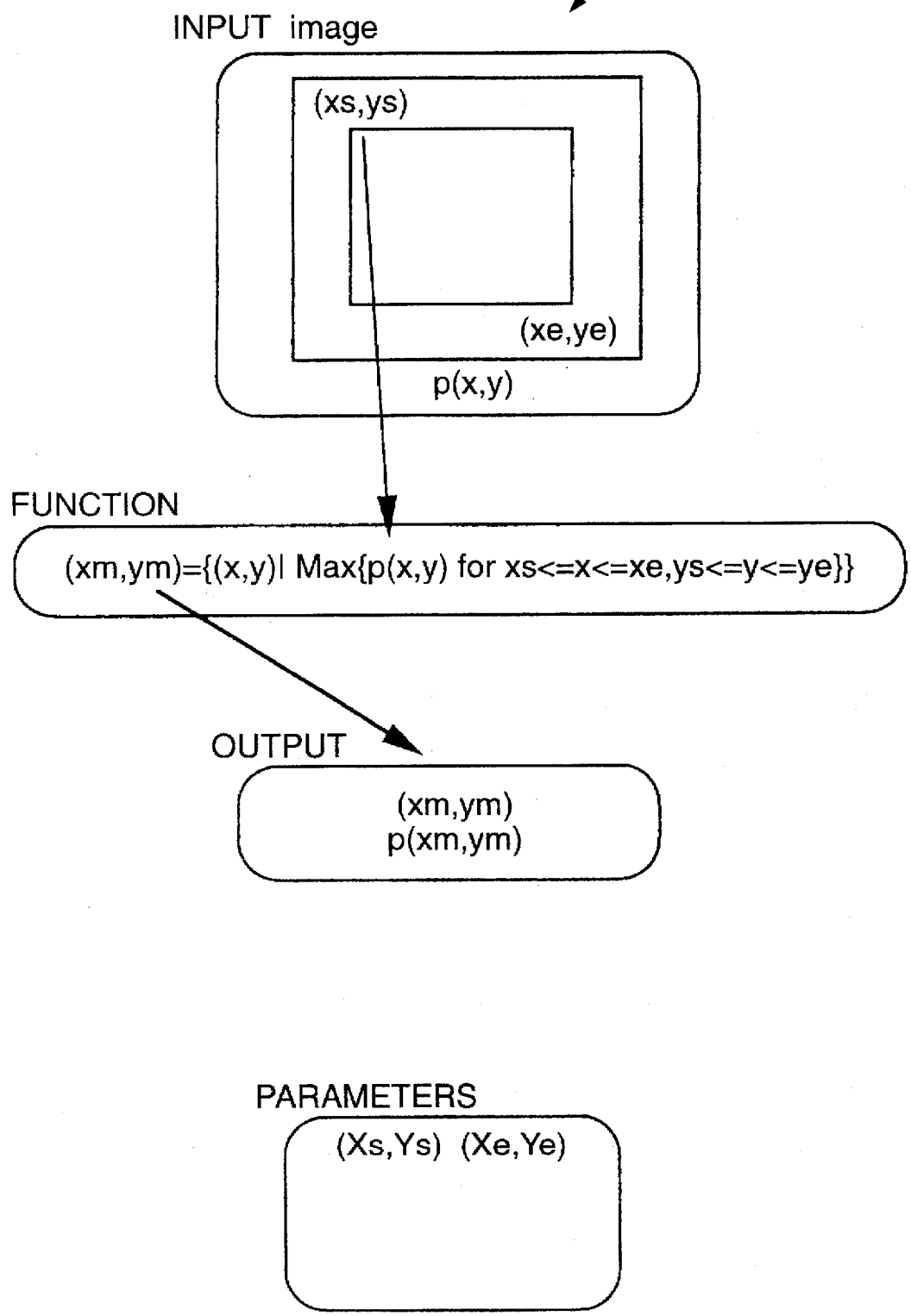
Figure 26:
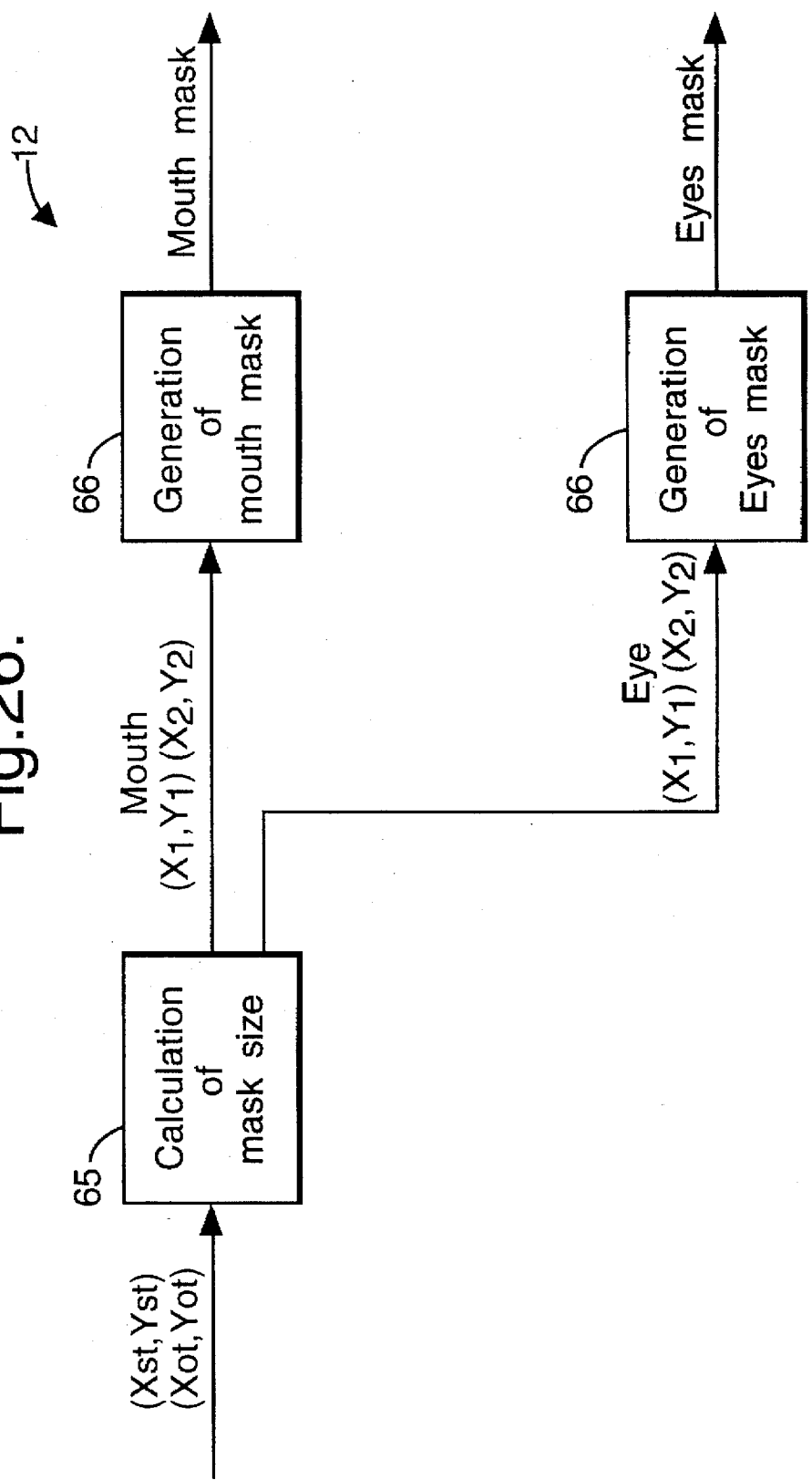
FIG. 26 and FIGS. 27(a) and (b) are block diagrams showing a unit for generation of facial part masks.

The smoothing shown in FIG. 24 involves averaging an area of pixels around a central reference pixel. All smoothing coefficients are unitary, which amounts to all pixels within the specified area being summed and then divided by the number of pixels. The purpose of this step is to help identify a single location where the fingertip is situated. If smoothing was not performed, then it is possible that there would be several pixels which have the maximum value, determined as shown in FIG. 25. It is then difficult to decide which pixel is the true position of the fingertip. By smoothing, an average of the pixels in a given area can be obtained. The position when the fingertip is located will have many pixels in close proximity to one another with high values, whereas areas where the fingertip is not located may have a few high value pixels sparsely separated. After averaging with the smoothing filter, the area of fingertip is enhanced and it is easier to locate to true position of the fingertip.

A consistency check is carried out by the ALU 61 in step 26 for acceptance or rejection of the generated position and area data for the colored fingertips. The detected area is displayed in step 27. A tip area check is carried out in step 28 to determine if the area of the fingertip is within a set tolerance At+At−. If the tip area check is positive, a flag TFLAG is set to 1 in step 29, otherwise it is set to 0.

Figure 28:
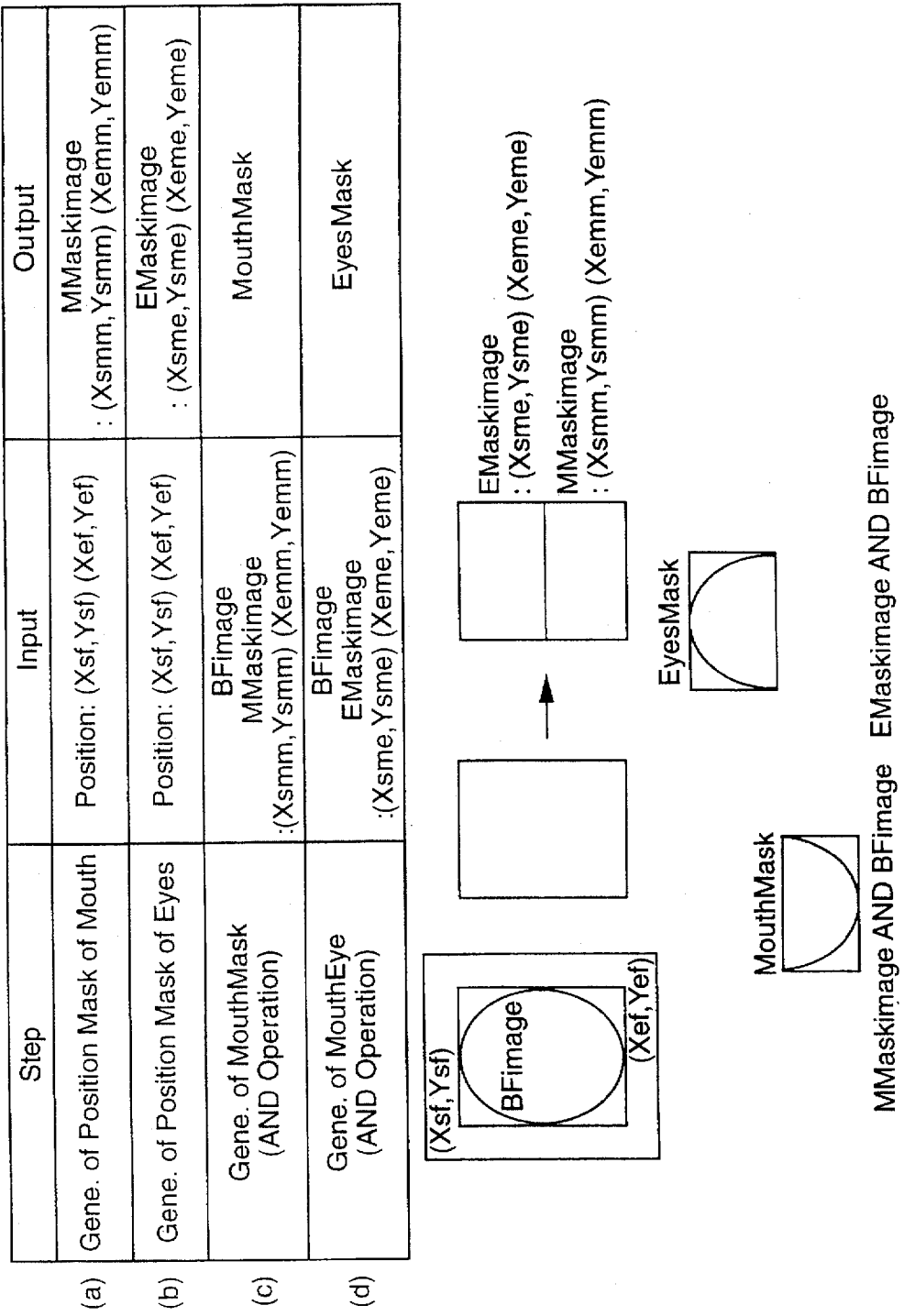
FIGS. 28 and 29 are diagrams showing facial part mask detection and input image masking steps in detail.
Figure 29:
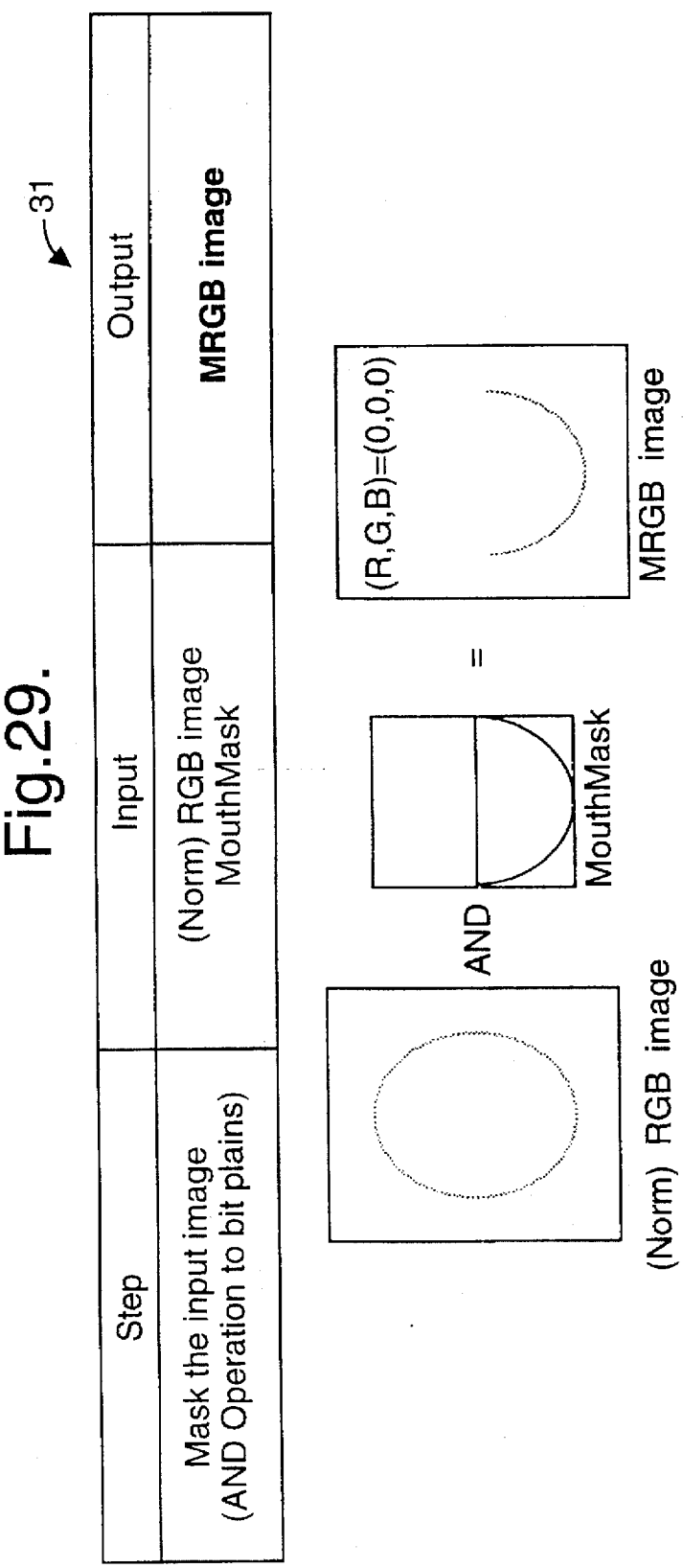

The unit 12 then operates to detect a facial part mask in step 30. The unit 12 is shown in more detail in FIGS. 26, 27(a) and 27(b) and the manner in which this step is carried out is illustrated in FIG. 28. This step involves generation of position masks for the mouth and for the eyes using the detected facial area data. Samples of the generated masks are shown at the bottom of FIG. 28. Step 31 involves masking the input image using the normalized RGB image, the mouth mask and the eyes mask as shown in FIG. 29. These masks restrict the area to search for the mouth and eyes to increase the recognition rate. The mask data is fed into the units 14 and 15.

The hardware for the mask generation is shown in FIG. 27 (a). The input into the component 65 is the Skin Area Box, (Xsf, Ysf, Xef, Yef). Essentially the Mouth Area and Eye Area are found by splitting this box into two equal regions so that the Eye Area is specified by the box (Xsf, Ysf, Xef, (Ysf+Yef)/2), and the Mouth Area is specified by the box (Xsf, (Ysf+Yef)/2, Xef, Yef).

Figure 27A:
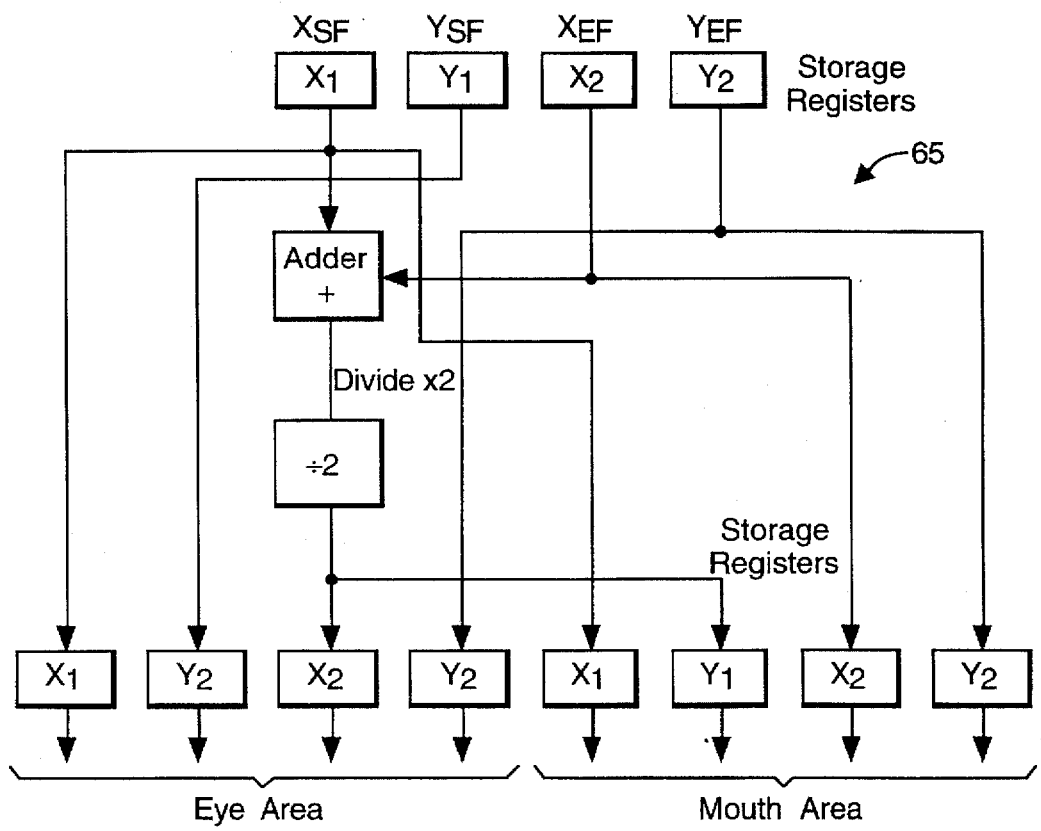
Figure 27B:
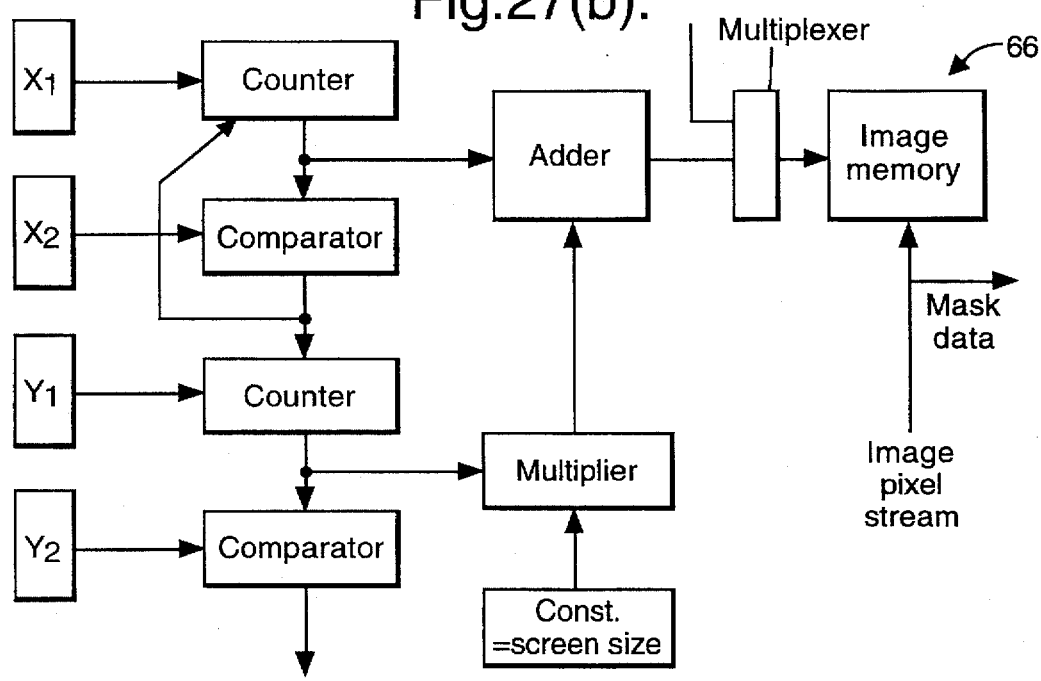

FIG. 27(b) shows the next stage of processing. The inputs to the component 66 are either the Mouth Area or the Eye Area parameters, which are stored in X1, X2, Y1 and Y2. The combination of counters, comparators and adder produce a pixel address stream which defines the box area in the context of the original image. By using this pixel address as the address to the original image, memory, it is possible to only process that part of the image which is defined as being either Eye Area or Mouth Area, as these pixels which are read from the image memory and passed to other image processing tasks. This technique is advantageous since only the pixels which are within the defined areas are processed by the post image processing hardware and not the whole image, and hence this is faster. Also shown is a multiplexor (MUX) and the Image Pixel Stream which is used to load the original image into the memory at each frame.

Position and area data for the mouth area is generated by the unit 14 in step 32 as shown in FIG. 30. The following sub-steps are involved:

(a) histogram (b) backprojection (c) smoothing #2

(d) max. value search (e) smoothing #1

(f) histogram (g) threshold value search (h) threshold of image (i) binary erosion (j) binary dilation (k) projection X & Y (l) projection search, and (m) area counting.

The unit 14 which carries out these tasks is shown in FIGS. 23(a) and (b) and the sub-steps, being previously described for facial and fingertip detection, will be readily understood from the above description. Of course, a difference is that a masked image is used. An output signal representing mouth area and position is generated.

In step 33, there is eye area detection by the unit 15 and reference is made to FIGS. 31 to 37. The sub-steps involved are outlined in FIGS. 31(a) and 31(b) and the unit 15 is shown in detail in FIGS. 32(a), 32(b), 32(c) and 33. The unit 15 comprises an AND gate 70 for reception of the eyes mask and RGB image data. A transformation circuit 71 is connected to the gate 70, and is in turn connected to a multi-template matching circuit 72. The circuit 71 is a SRAM look-up table. The multi-template matching circuit 72 comprises a set of matching circuits 75 connected to a comparator 76, in turn connected to a smoothing #2 circuit 77 similar to that previously described. Further, there are first and second ALU's 78 and 79 connected to a set constant circuit 80. A template matching circuit 75 is shown in detail in FIG. 33.

Figure 33:
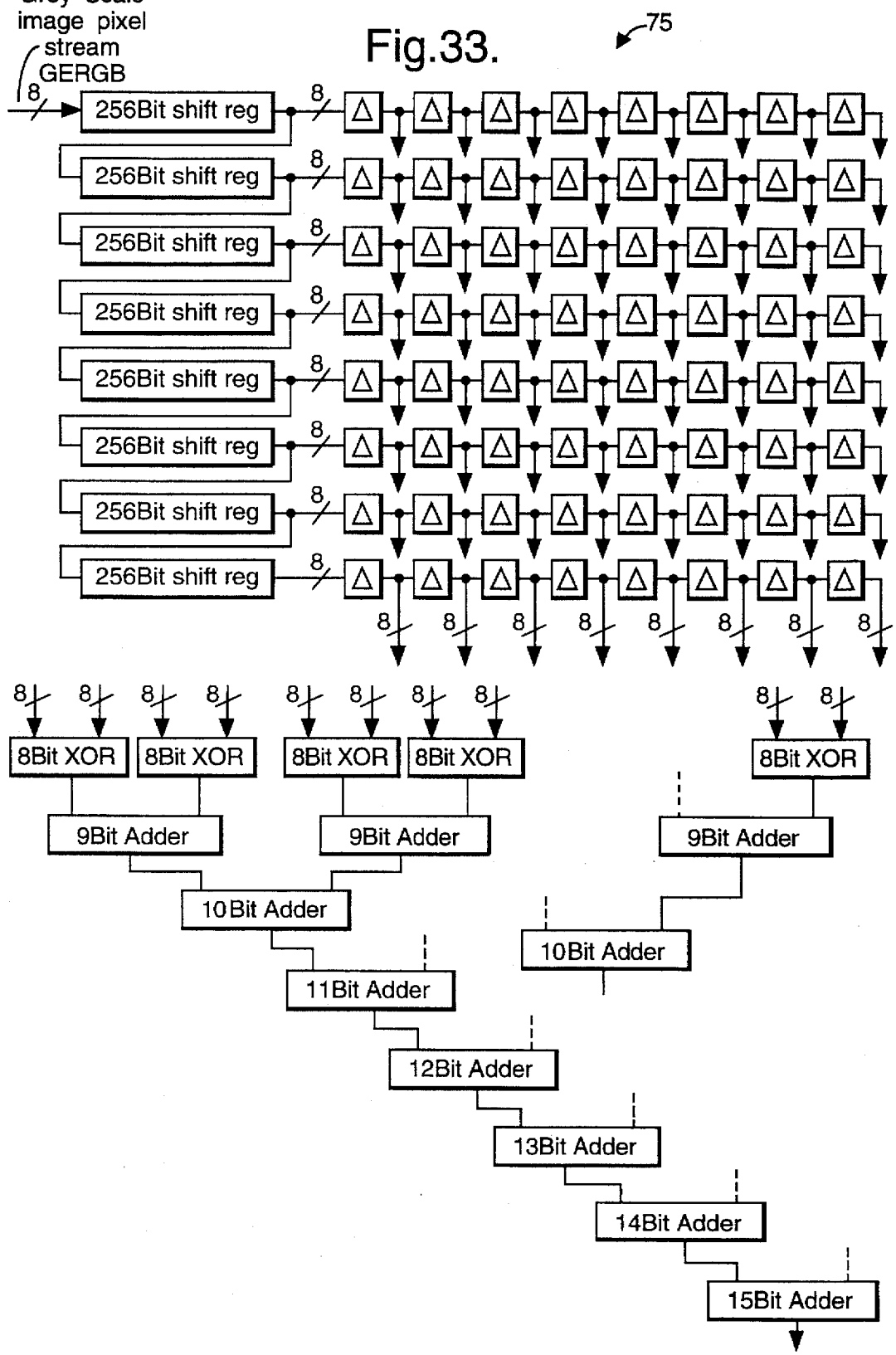
Figure 35:
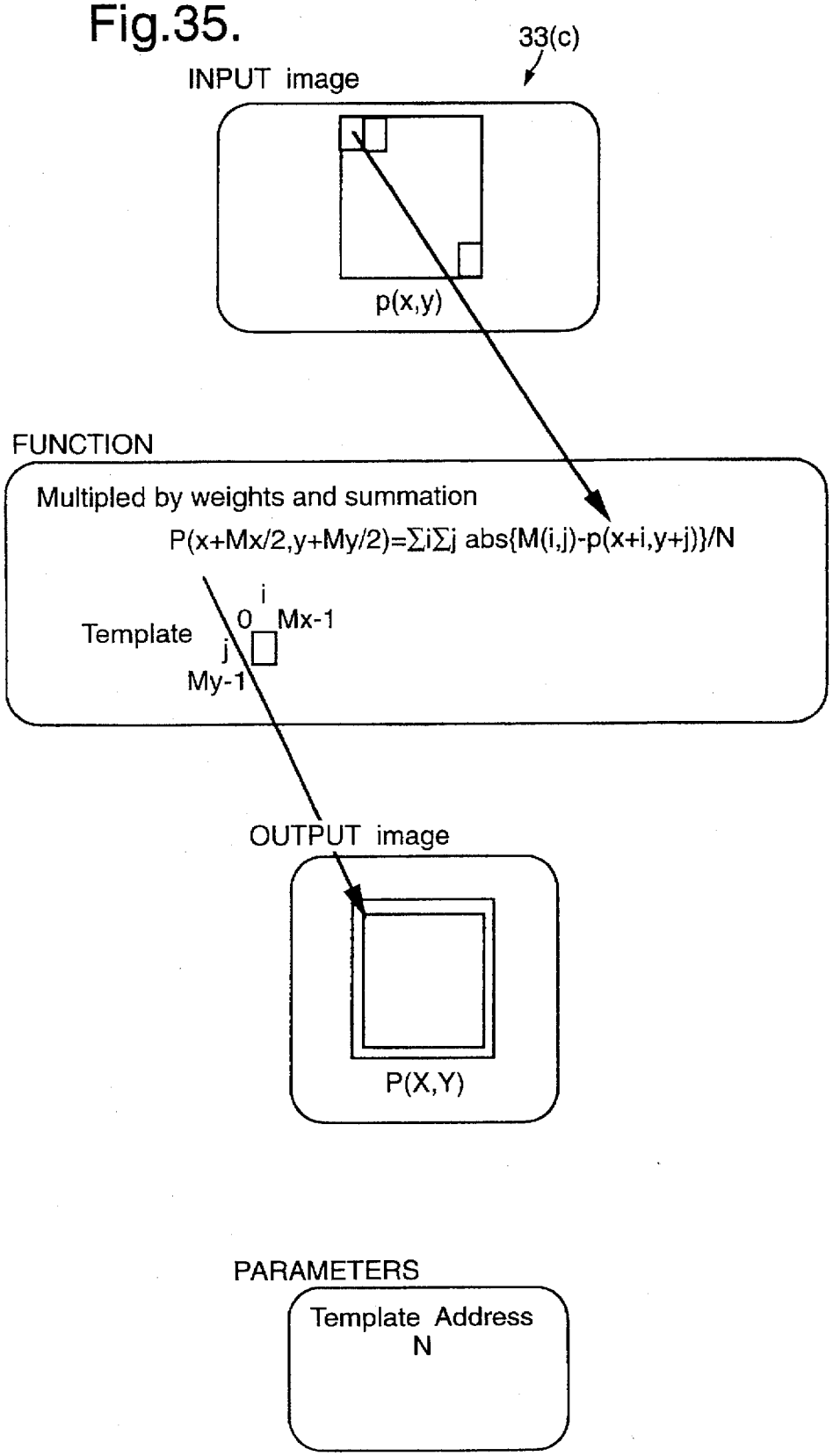
Figure 36:
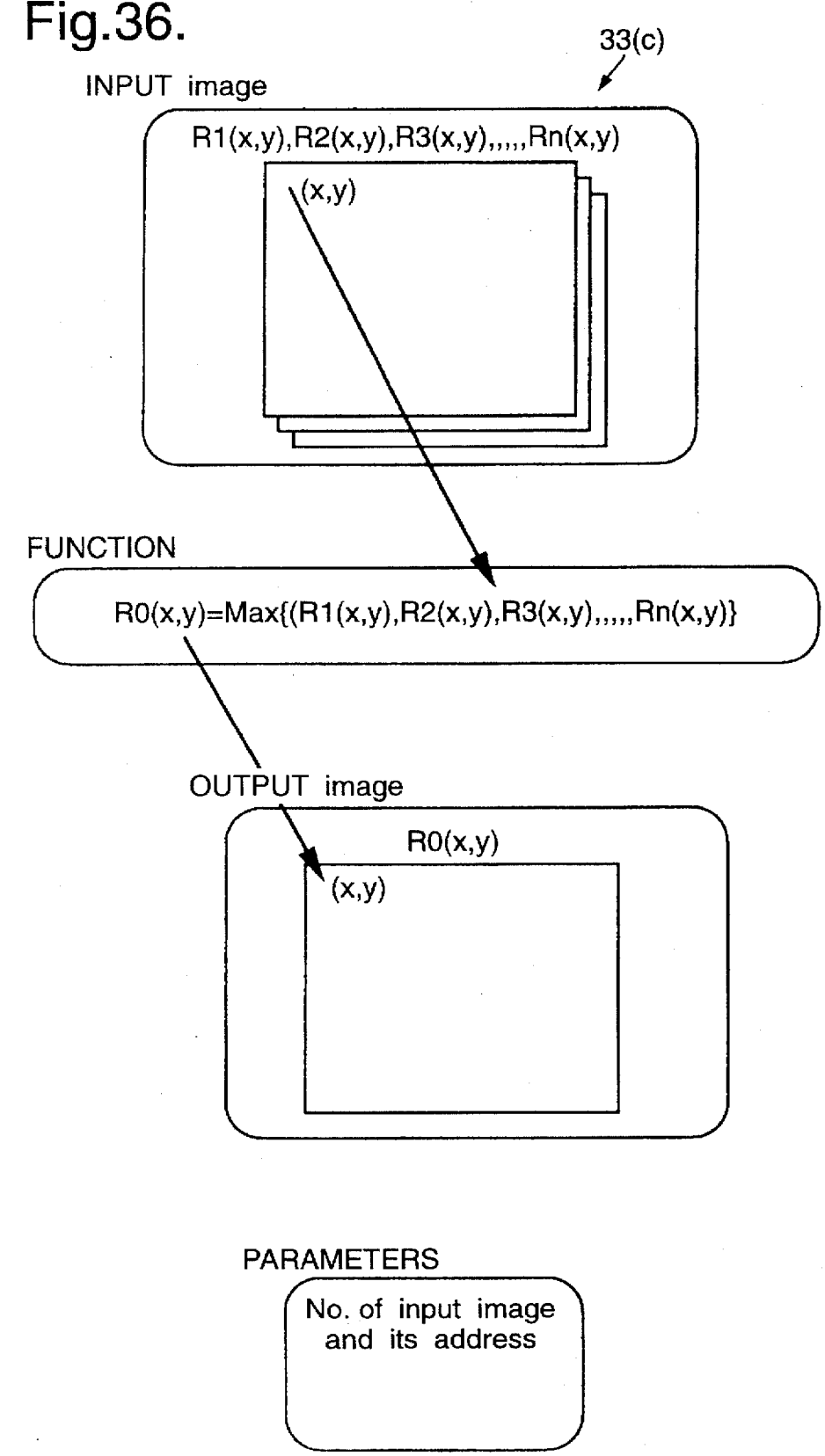

In operation, the main inputs are the eye mask data from the unit 12 and the normalized input image from the unit 10, the purpose being to determine the eye positions. After the signals are processed by an AND gate, a SRAM 71 averages and divides by three to give a grey scale value as shown in FIG. 34. The multi-template matching circuit 72 determines the best match for each eye as shown in FIGS. 35 to 37, a comparator selecting the closest match. The image is smoothed to determine peak intensities for the eyes by two ALU's. A constant is set to ensure that here is no repetition in determining peaks. The circuit 75 for multi-template matching is an 8×8 correlator as illustrated in FIG. 33. In this circuit, the sub-script e1 represents the first eye, e2 the second eye.

In step 34 a consistency check is carried out to ensure that the general locations of the detected areas are consistent with the general face layout. In step 35 the detected area is displayed.

A decision is then made by the workstation 5 to determine the nearest facial part to the fingertip in step 37, provided the flag TFLAG has been set to one as indicated by the decision step 36. The result is then displayed in step 38 and this involves display of the relevant part in a different color within a square box. The process ends in step 39.

Figure 38:
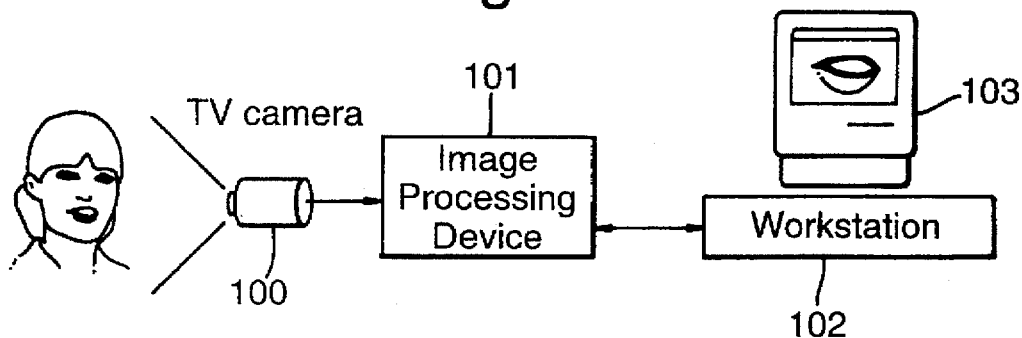
FIG. 38 is a schematic diagram showing a communications support system of the invention to help deaf people to lip read.
Figure 39:
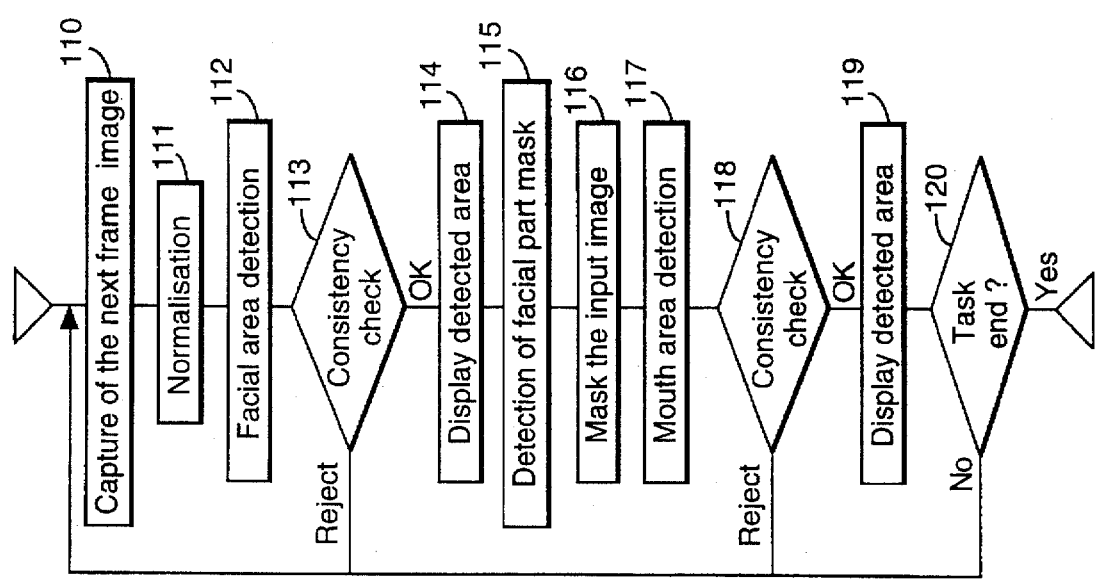
FIG. 39 is a flow diagram showing operation of this system.

Another aspect to the invention is shown in FIGS. 38 and 39 whereby the system acts as a communications support system comprising a TV camera 100, an image processing device 101 and a workstation 102 with a video screen 103. The image processing device 101 and the workstation 102 carry out the process steps 110 to 120 shown in FIG. 39. Basically, this system involves use of a sub-set of the circuits shown in the relevant previous drawings. The steps include capture of the next frame image in step 110 followed by normalization in step 111 and facial area detection in step 112. In step 113 a consistency check is carried out and the system proceeds to step 114 involving display of the detected area if the consistency check output is positive. In step 115 there is detection of the facial part mask and the input image is masked in step 116 for mouth area detection 117. After a consistency check 118, the detected areas displayed in step 119 and the method ends in step 120.

It will be appreciated that the communication support system shown in FIG. 38 allows a TV camera to pick up the facial image of a non-deaf person and provides for the generation of a facial image to detect the location of the mouth and its area. This information is transmitted to the workstation 102 which displays the mouth image after the image is magnified. This greatly facilitates lip reading by a deaf person.

Figure 40:
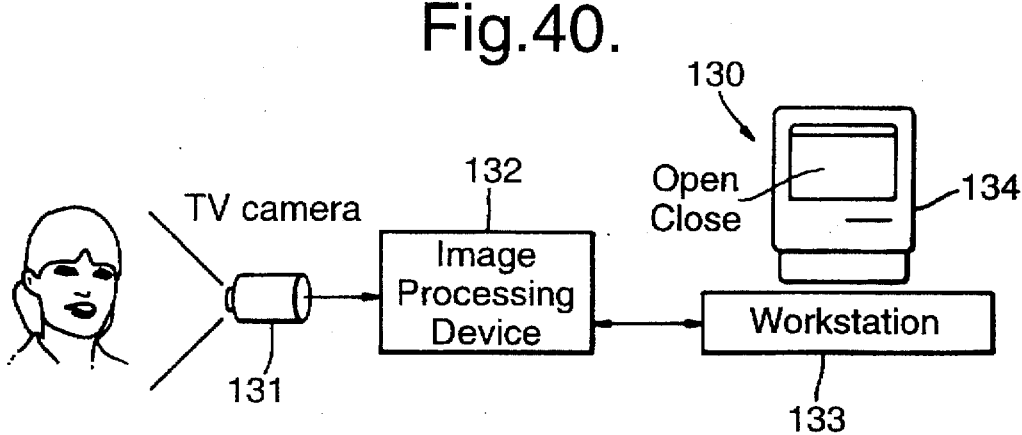
FIG. 40 is a schematic diagram showing a machine interface for lip reading and FIG. 41 is a flow diagram showing operation of this system.

A still further aspect of the invention is now described with reference to FIGS. 40 and 41. A system 130 comprises a TV camera 131, an image processing device 132, a workstation 133 and a video screen 134. The purpose of the system 130 is to provide for the inputting of machine commands by silent lip movement. The TV camera 131 picks up the user's facial image and the device 132 processes the image to detect the location of the mouth and its area in real time. Using this information, the device recognises the word (command) and this is transmitted to the workstation 133. The workstation 133 is controlled by this command to generate a display as shown on the video screen 134. Operation of the device 132, is described in FIG. 41 and it involves capture of the next frame image in step 140, normalization, 141 and facial area detection 142. There is a consistency check 143 and the detected area is displayed in step 144. Step 145 involves detection of the facial part mask and the input image is masked in step 146 for mouth area detection 147. After a consistency check 148, the detected area is displayed in step 149 and in step 150 the positional area inputs are matched with templates for generation of a command.

We claim:

1. An image processing apparatus comprising:

means for receiving a color facial image data stream in digital format;

a plurality of image data processing circuits interconnected for real time processing the image data in a pipelining manner to provide a real time output, the circuits comprising:

means for monitoring color values in the image data to identify image data pixels representing facial parts, and monitoring means comprising means for carrying out three-dimensional color histogram matching to monitor frequency of occurrence of pixel values in the image data and a backprojection means for comparing a generated histogram with a template histogram generated off-line, and means for determining states of the facial parts by monitoring positional coordinates of the identified pixels, said means for determining further comprising a counter for determining the area of the facial part or parts; and an output device outputting the determined facial part state data in real time.

2. An apparatus as claimed in claim 1 further comprising means for normalizing the received color facial image data stream.

3. An apparatus as claimed in claim 1 wherein the processing circuits comprise:

a facial area detection unit comprising circuits for carrying out facial area detection operations on the image data; and a facial part detection unit connected to said facial area detection unit and comprising processing circuits for determining states of a facial part within the detected facial area using the image data and an output signal from said facial area detection unit.

4. An apparatus as claimed in claim 3 further comprising a mask generating circuit connected between the facial area and facial part detection units.

5. An apparatus as claimed in claim 3 comprising two facial detection units, including:

a mouth area detection unit; and an eye area detection unit.

6. An apparatus as claimed in claim 5 wherein the apparatus further comprises a mask generating circuit connected between the facial area detection unit and the facial part detection units, said mask generating circuit unit comprising means for generating an eye mask signal and a mouth mask signal.

7. An apparatus as claimed in claim 5 wherein the mouth area and eye area detection units are connected in the apparatus to operate on the same image data in parallel.

8. An apparatus as claimed in claim 1, wherein the apparatus further comprises means for carrying out a consistency check to validate determined positional data.

9. An apparatus as claimed in claim 8 wherein each processing circuit comprises means for carrying out a consistency check on positional data which it generates.

10. An apparatus as claimed in claim 8 wherein the consistency check means comprises a processor programmed to compare the positional data with reference positional data.

11. An apparatus as claimed in claim 1 wherein the monitoring means comprises means for carrying out binary erosion and binary dilation steps to generate image data in which noise is reduced and the subject area is recovered.

12. An apparatus as claimed in claim 1 further comprising image data processing circuits for determining location of a colored fingertip represented in the input image data.

13. An apparatus as claimed in claim 1 comprising image processing circuits for facial area and separate image processing circuits for colored fingertips, said circuits being connected to process the input image data in parallel.

14. An apparatus as claimed in claim 12 further comprising a result processor comprising means for receiving facial part and colored fingertip positional data to generate an output signal representing proximity of a colored fingertip to facial parts for assistance in communication of sign language.

15. An apparatus as claimed in claim 1 further comprising a video device for generating the image data stream.

16. An apparatus as claimed in claim 15, wherein the video device is a camera having an analog to digital converter.

17. An apparatus as claimed in claim 15 wherein the video device is a camera, and the camera is mounted on a frame adjacent a light source so that it is directed upwardly at an angle so that the face of a person seated next to the frame is within the field of view.

18. A method of processing facial image data, the method comprising the steps of:

receiving a digital color image data stream;

monitoring color values in the image data to identify image data pixels representing facial parts, said monitoring step comprising sub-steps of carrying out three-dimensional color histogram matching in which there is backprojection with comparison of a generated three-dimensional color histogram with a template histogram generated off-line;

determining states of the facial parts by monitoring positional coordinates of the identified pixels and using a counter to determine the area of the facial parts, said monitoring and determining steps being carried out by processing circuits interconnected for real time processing the image data in a pipelining manner; and outputting in real time a signal representing the determined facial part state data.

19. A method as claimed in claim 18, wherein the monitoring and determining steps are carried out to initially identify facial area and position, and subsequently to identify facial parts and determine states of the facial parts.

* * * * *

UNITED STATES PATENT AND TRADEMARK OFFICE
CERTIFICATE OF CORRECTION

PATENT NO. : 5,689,575

DATED : 18 November 1997

INVENTOR(S) : Hiroshi SAKO et al.

Figure 41A:
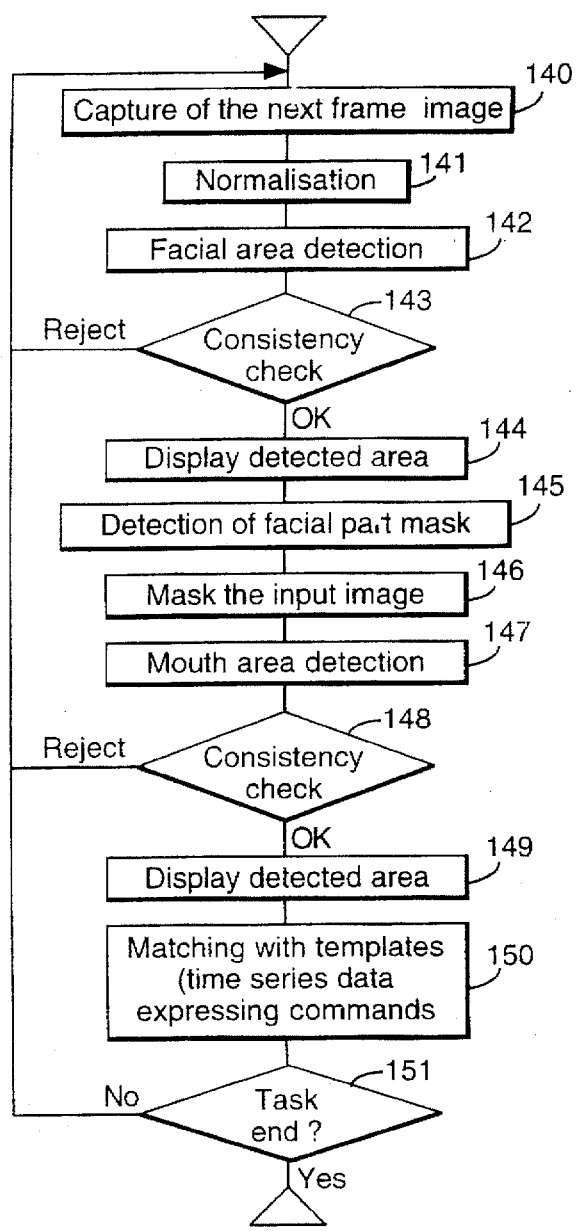

It is certified that error appears in the above-indentified patent and that said Letters Patent is hereby corrected as shown below:

| Column | Line | |
|---|---|---|
| 3 | 6 | Change "reading and FIG. 41" to --reading, FIG. 41(a)--. |
| 3 | 7 | After "system" insert --and FIG. 41(b) is a table indicating the input and output associated with each of the steps of the flow diagram of Fig. 41(a)--. |
| 10 | 14 | Change "41" to --41(a) and 41(b)--. |

Signed and Sealed this

Twenty-eighth Day of July, 1998

Attest:

BRUCE LEHMAN

Attesting Officer      Commissioner of Patents and Trademarks